United States Patent [19]

Beretta et al.

[11] 4,025,347

[45] May 24, 1977

[54] TOGGED DIRECT-POSITIVE SILVER HALIDE EMULSION CONTAINING A CYANINE DYE HAVING AN INDOLE OR INDOLENINE NUCLEUS SUBSTITUTED WITH A BENZOYL OR A PHENYLSULFONYL GROUP

[75] Inventors: Paolo Beretta, Ferrania, Savona; Luigi Valbusa, Savona, both of Italy

[73] Assignee: Minnesota Mining and Manufacturing Company, St. Paul, Minn.

[22] Filed: June 12, 1974

[21] Appl. No.: 478,710

[30] Foreign Application Priority Data

June 18, 1973 Italy .................................. 50882/73

[52] U.S. Cl. ................................... 96/101; 96/107; 96/108; 96/130; 96/133; 96/135; 96/137; 96/138; 96/129; 96/139; 96/140; 260/240 E; 260/240.6; 260/240.65; 260/240.7

[51] Int. Cl.² ..................... G03C 1/36; G03C 1/28

[58] Field of Search .... 96/130, 101, 100, 131–138, 96/107–108; 260/240 E, 240.6, 240.65, 240.7

[56] References Cited

UNITED STATES PATENTS

| | | | |
|---|---|---|---|
| 2,521,705 | 9/1950 | Firestine | 96/137 |
| 3,468,661 | 9/1969 | Libeer et al. | 96/137 |
| 3,615,642 | 10/1971 | Ficken et al. | 96/137 |
| 3,767,651 | 10/1973 | Chapman | 96/101 |
| 3,867,146 | 2/1975 | Nakazawa et al. | 96/137 |

*Primary Examiner*—Won H. Louie, Jr.
*Attorney, Agent, or Firm*—Cruzan Alexander; Donald M. Sell; Mark A. Litman

[57] ABSTRACT

New cyanine dyes, comprising at least one of the following nuclei (or derivatives thereof):
1. 2,3,3-trimethyl-5-phenyl-sulfonyl-indolenine;
2. 2,3,3-trimethyl-5-benzoyl-indolenine;
3. 1-aryl or alkyl-2-phenyl-5-phenyl-sulfonyl-indole;
4. 1-aryl or alkyl-2-phenyl-5-benzoyl-indole, are desensitizers for silver halide negative emulsions and useful electron acceptor spectral sensitizers for direct positive silver halide emulsions.

6 Claims, No Drawings

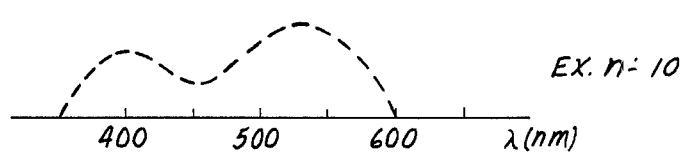
EX. n= 10
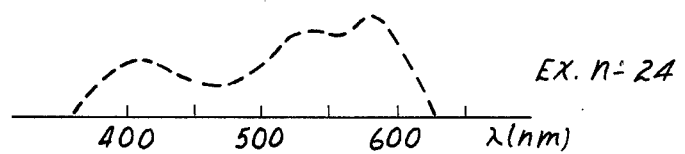
EX. n= 24
EX. n= 26
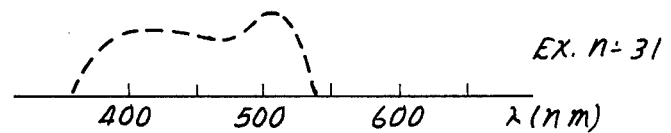
EX. n= 31
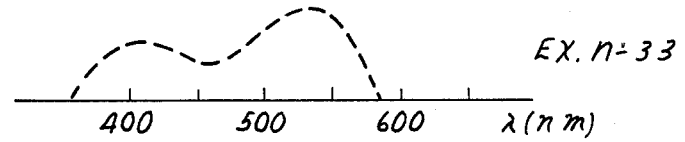
EX. n= 33
JARREL - ASH SPECTRA

TOGGED DIRECT-POSITIVE SILVER HALIDE EMULSION CONTAINING A CYANINE DYE HAVING AN INDOLE OR INDOLENINE NUCLEUS SUBSTITUTED WITH A BENZOYL OR A PHENYLSULFONYL GROUP

The present invention refers to a new class of cyanine dyes and their use as spectral sensitizers in direct positive photographic materials of the spectrally sensitized type.

The new class of cyanine dyes of the present invention comprises at least one heterocyclic nucleus comprising a 5 or 6-membered ring joined by a methine linkage to another heterocyclic nucleus or para-amino phenyl nucleus, the first said heterocyclic nuclei being an indole or indolenine nucleus carrying in the phenyl ring thereof a substituent of the benzoyl ($-COC_6H_5$) or phenyl-sulfonyl ($-SO_2C_6H_5$) type.

More precisely, in one embodiment, the first heterocyclic nucleus is a 5-benzoyl-2-aryl-indole or a 5-phenyl-sulfonyl-2-aryl-indole joined to the methine linkage at the 3-position of the said nucleus; the second heterocyclic nucleus being a nucleus selected from the class of sensitizing or desensitizing nuclei joined to the other end of the methine chain. Preferably, the methine chain contains two or three carbon atoms and can further carry at least one substituent.

The new cyanine dyes of the present invention derived from 5-benzoyl-2-aryl-indole and 5-phenyl-sulfonyl-2-aryl-indole include those represented by the following general formulas:

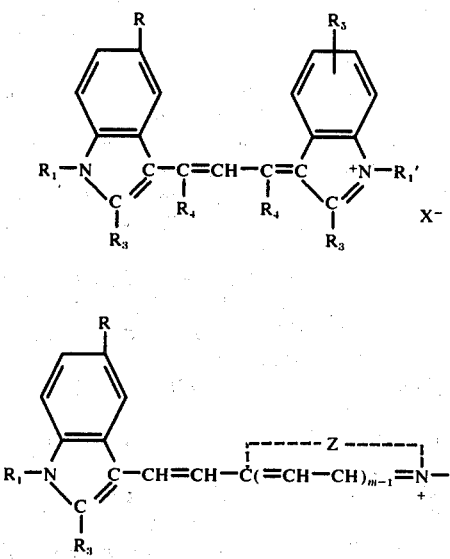

wherein:

$m$ represents a positive integer of from 1 to 2;

R represents a $-COC_6H_5$ or $-SO_2C_6H_5$ group;

$R_1$ and $R_1'$ each represent a hydrogen atom or an alkyl group, such as for instance methyl, ethyl, propyl, butyl, isobutyl, hexyl, cyclohexyl, decyl, dodecyl, etc.; or a substituted alkyl group, such as for instance a hydroxyalkyl group (for instance $\beta$-hydroxyalkyl or $\Omega$-hydroxybutyl); an alkoxyalkyl group (for instance $\beta$-methoxyethyl or $\Omega$-butoxybutyl); a carboxyalkyl group (for instance $\beta$-carboxyethyl or $\Omega$-carboxybutyl); a sulfoalkyl group (for instance $\beta$-sulfo-ethyl or $\Omega$-sulfobutyl); a sulfatoalkyl group (for instance $\beta$-sulfatoethyl or $\Omega$-sulfatobutyl); an acyloxyalkyl group (for instance $\beta$-acetoxyethyl, $\delta$-acetoxypropyl or -butyryloxypropyl); an alkoxycarbonylalkyl group (for instance $\beta$-methoxycarbonylethyl or $\omega$-methoxycarbonylbutyl); a cyanoalkyl group containing from 1 to 8 carbon atoms and preferably from 2 to 4 carbon atoms (for instance 2-cyanoethyl or 4-cyanobutyl, etc.); an aryl group or a substituted aryl group (for instance phenyl, tolyl, naphthyl, chlorophenyl, nitrophenyl, etc); an aralkyl group (for instance benzyl, phenethyl, etc.); represents an alkyl group or a substituted alkyl group like those mentioned for $R_1$ and $R_1'$ or a group like allyl, 1-propenyl, etc., an aryl group such as for instance phenyl, tolyl, naphthyl, chlorophenyl groups, etc.;

$R_3$ represents an aryl group or a substituted aryl group, such as for instance phenyl, tolyl, methoxyphenyl, chloro-phenyl, etc.;

$R_4$ represents a hydrogen atom, a lower alkyl group containing from 1 to 4 carbon atoms, such as methyl, ethyl, propyl, butyl, isopropyl, etc.; an aryl group, for instance a phenyl tolyl, naphthyl, chlorophenyl group, etc; a heterocyclic group, such as for instance a thienyl: at least one of the substituents $R_4$ is hydrogen;

$R_5$ represents a hydrogen atom, an alkyl group, an alkoxy group preferably containing from 1 to 4 carbon atoms; an aryloxy group, such as for instance phenoxy, tolyloxy group, etc.; a halogen atom, for instance chlorine, bromine, etc; a nitrogroup; a $-COC_6H_5$ benzoyl group or a $-SO_2C_6H_5$ group;

$X^-$ represents an acid anion, for instance chloride, bromide, iodide, sulfonate, perchlorate, p-toluenesulfonate, methylsulfate, etc.;

Z represents the non-metallic atoms required to complete a sensitizing or desensitizing heterocyclic nucleus containing from 5 to 6 atoms in the heterocyclic nucleus, which may also include more than one hetero-atom, such as for instance oxygen, sulfur, selenium or nitrogen, for instance the following nuclei: a nucleus of the series of the thiazole, (for instance thiazole, 4-methyl-5-phenyl-thiazole, 5-methyl-thiazole, 5-phenyl-thiazole, 4,5-dimethyl-thiazole, 4,5-diphenyl-thiazole, 4-(2-thienyl)-thiazole or 4-nitro-thiazole); of the benzothiazole (e.g., benzothiazole, 4-chloro-benzothiazole, 5-nitro-benzothiazole, 5-chloro-benzothiazole, 6-nitro-benzothiazole, 5,6-dinitro-benzothiazole, 6-chlorobenzothiazole, 7-chloro-benzothiazole, 4-methyl-benzothiazole, 5-methyl-benzothiazole, 6-methyl-benzothiazle, 5-bromo-benzothiazole, 6-bromo-benzothiazole, 5-phenyl-benzothiazole, 6-phenyl-benzothiazole, 4-methoxy-benzothiazle, 5-methoxy-benzothiazole, 6-methoxy-benzothiazle, 5-bromo-benzothiazole, 5-iodo-benzothiazole, 6-indo-benzothiazole, 4-ethoxy-benzothiazole, 5-ethoxy-benzothiazole, tetrahydro-benzothiazole, 5,6-dimethoxy-benzothiazole, 5,6-dioxymethylene-benzothiazole, 5-hydroxy-benzothiazole, 6-hydrodxy-benzothiazole); of the naphthothiazole (e.g., $\alpha$-naphthothiazole, $\beta$-naphthothiazole, 5-methoxy-$\beta$-naphthothiazole, 5-ethoxy-$\beta$-naphthothiazle, $\beta$-methoxy-$\alpha$-naphthothiazole, 7-methoxy-$\alpha$-naphthothiazole); of the naphthothiazoles having a nitro-substituent; of the oxazole (e.g., 4-methyloxazole, 4-nitro-oxazole, 5-methyl-oxazole, 4-phenyl-oxazole, 4,5-diphenyl-oxazole, 4-ethyl-oxazole, 4,5-dimethyl-oxazole, 5-phenyl-osazole); of the benzoxazole (e.g., benzoxazole, 5-chloro-benzoxazole, 5-nitro-benzoxazole, 5methyl-benzoxazole, 5-phenyl-benzoxazole, 6-nitro-benzoxazole, 6-methyl-benzoxazole, 5,6-dinitro-benzoxazole, 5,6-dimethyl-benzoxazole, 4,6-dimethyl-benzoxazle, 5-methoxy-benzoxazole, 5-ethoxy-benzoxazole, 5-chloro-benzoxazole, 5-bromo-benzoxazole, 5-iodo-benzoxazole, 6-methoxy-benzoxazole, 5-hydroxy-benzoxazole, 6-hydroxy-benzoxazole); of the naphthoxazole (e.g., α-naphthoxazole, β-naphthoxazole); of the naphthoxazoles substituted with a nitro-group; of the selenazole (e.g., selenazole, 4-methyl-selenazole, 4-phenyl-selenazole); of the benzoselenazole (e.g., benzoselenazole, 4-nitro-benzoselenazole, 6-nitro-benzoselenazole, 5-chloro-benzoselenazole, 5-methoxy-benzoselenazole, 5-hydroxy-benzoselenazole, 5-nitro-benzoselenazole, tetrahydro-benzoselenazole); of the naphtho-selenazole (e.g., α-naphtho-selenazole, β-naphthoselenazole); of the naphthoselenazoles substituted with a nitro-group; of the thiazoline (e.g., thiazoline, 4-methylthiazoline, 4-nitro-thiazoline, etc.); of the pyridine (e.g., pyridine, 2-pyridine, 5-methyl-2-pyridine, 4-pyridine, 3-methyl-4-pyridine); pyridine substituted with a nitro-group; of the quinoline (e.g., quinoline, 2quinoline, 3-methyl-quinoline, 5-ethyl-quinoline, 6-chloro-quinoline, 8-chloro-quinoline, 6-methoxy-quinoline, 8-ethoxy-quinoline, 8-hydroxy-quinoline); of the 4-quinoline (e.g., 6-methoxy-4-quinoline, 7-methoxy-4-quinoline, 7-methyl-4-quinoline, 8-chloro-4-quinoline); of the 1-isoquinoine (e.g., 3,4-dihydro-1-isoquinoline); 3-isoquinoline; quinolines having a nitro-substituent; of the 1,1-dialkyl-indolenine (e.g., 1,1-dimethyl-5 or 6-cyano-indolenine, 1,1-dimethyl-5 or 6-nitro-indolenine, 1,1-dimethyl-5-chloro-indolenine, 1,1-dimethyl-5-phenylsulfonyl-indolenine, 1,1-dimmethyl-5-benzoyl-indolenine) of the imidazole (e.g., imidazole, 1-alkyl-imidazole, 1-alkyl-4-phenyl-imidazole, 1-alkyl-4,5-dimethyl-imidazole); of the benzimidazole (e.g., 1alkyl-benzimidazle; 1-aryl-5,6-dichloro-benzimidazoles); of the naphthimidazole (e.g., 1-alkyl-α-naphthoimidazole, 1-aryl-β-naphtho-imidazole, 1-alkyl-5-methoxy-α-naphtho-imidazole). The nuclei, wherein Z represents the atoms required to make a nitro-substituted heterocyclic nucleus, give desensitizing dyes particularly useful to make direct positive emulsions and materials using such emulsions according to the present invention. Particularly, the preferred nuclei are selected from the groups formed by nitro-benzothiazoles (e.g., 5-nitro-benzothiazole, 6-nitro-benzothiazle, 5-chloro-6-nitro-benzothiazole); or from the groups formed by the homologous derivatives obtained by substituting sulfur with oxygen or selenium, or from the groups formed by imidazo[4,5-b]quinoxalines (e.g., imidazo [4,5-b]quinoxaline, 1,3-dialkyl-imidazo[4,5-b]quinoxaline, 1,3-diethyl-imidazo[4,5-b]quinoxaline, 6-chloro-1,3-diethyl-imidazo [4,5-b]quinoxaline, 1,3-dialkenyl-imidazo[4,5-b]quinoxaline, 1,3-diallyl-imidazo[4,5-b]quinoxaline, 6,7-dichloro-1,3-diallyl-imidazo[4,5-b]quinoxaline, 1,3-diaryl-imidazo[4,5-b]quinoxaline, 1,3-diphenyl-imidazo[4,5-b]quinoxaline, 6-chloro-1,3-diphenyl-imidazo[4,5-b]quinoxaline); or from the groups formed by 3H-pyrrolo[2,3-b]pyridine (e.g., 3,3-dialkyl-3H-pyrrolo[2,3-b]pyridine, 3,3-diethyl or 3,3-dimethyl-3H-pyrrolo[2,3-b]pyridine); or from the groups formed by 3H-nitro-indoles (e.g., 3,3-dialkyl-3H-nitro-indole, 3,3-dimethyl or 3,3-diethyl-5-nitro-3H-indole); from the groups formed by thiazole[4,5-b]quinoline or formed by nitro-quinoline (e.g., 5-nitro-quinoline, 6-nitro-quinoline, etc.).

With regard to the above-mentioned substituent groups (i.e., R, $R_1'$, $R_1$, $R_2$, $R_3$, $R_4$, $R_5$, $X^-$, and Z), the size of the groups is not believed to be of any substantive significance in the practice of this invention. Size changes may only require modification of solvents necessary to include them in direct positive emulsions, but the action of these dyes is believed the same substantially without regard to size.

However, for purposes of economics, the following moiety sizes are generally preferred. The second nucleus (heterocyclic or para-amino phenyl) should contain no more than 50 carbon atoms and no more than 10 non-metallic heteroatoms (metal atoms may appear in these groups only in form of salts). No more than 5 heteroatoms should appear in the ring itself. It is more preferred that such second nucleus contain no more than 30 carbon atoms and most preferred that it contain no more than 20 carbon atoms. For groups $R_1$, $R_2$ and $R_1'$, it is generally preferred to have no more than 18 carbon atoms and most preferred to have no more than 12 carbon atoms and with up to 5 heteroatoms. The generally preferred aryl groups of this invention (including those in aralkyl groups) are phenyl and naphthyl and derivatives thereof having no more than 10 non-metallic heteroatoms. It is more preferred to have no more than 20 carbon atoms and most preferred having no more than 12 carbon atoms.

$R_4$ is preferred to have no more than 5 heteroatoms and no heteroatoms are desirable in $R_5$. Niether $R_4$ nor $R_5$ should contain metal atoms.

Among the salts of the most representative dyes, the salts of the following compounds can be mentioned:

A. 1,1'-dimethyl-5,5'-di(phenylsulfonyl)-2,2'-diphenyl-3,3'-indolocarboxyanine;
B. 1,1'-dibutyl-5,5'-di'(phenylsulfonyl)-2,2'-diphenyl-3,3'-indolocarboxyanine;
c. 1,1'-dimethyl-5,5'-dibenzoyl-2;2'-diphenyl-3,3'-indolocarbocyanine;
D. 1,1'-dimethyl-5'-chloro-5-phenylsulfonyl-8-ethyl-2,2'-diphenyl-3,3'-indolocarboxyanine;
E. 1,1'-dimethyl-5'-phenoxy-5-phenylsulfonyl-2,2',8-triphenyl-3,3'-indolocarbocyanine;
F. 1,1'-dimethyl-5-ethyl-5'-nitro-2,2'-diphenyl-3,3'-indolocarboxyanine;
G. 1,1'-dimethyl-5-phenylsulfonyl-2,2'-diphenyl-3,3'-indolocarbocyanine;
H. 1-methyl-3'-ethyl-5-phenylsulfonyl-6'-nitro-2-phenyl-3-indolothiacarbocyanine;
I. 1-methyl-3'-ethyl-5-phenylsulfonyl-6'-nitro-2-phenyl-3-indoloselenacarbocyanine;
L. 1-methyl-3'-ethyl-5-phenylsulfonyl-6'-nitro-2-phenyl-3-indoloxacarbocyanine;
M. 1-H-3'-ethyl-5-phenylsulfonyl-6'-nitro-2-phenyl-3-indolothiacarbocyanine;
N. 1-H-3'-ethyl-5-benzoyl-6'-nitro-2-phenyl-3-indolothiacarboxyanine;

O. 1,3-diethyl-1'-methyl-5'-phenylsulfonyl-2'-phenyl-imidazo[4,5-b]quinoxaline-3'-indolocarboxyanine;

P. 1'-methyl-5'-phenylsulfonyl-1',2',3-triphenyl-imidazo [4,5-b]quinoxaline-3'-indolocarbocyanine;

Q. 1,1',3,3'-tetramethyl-5-phenylsulfonyl-2-phenyl-3-indolopyrrolo[2,3-b]pyridocarbocyanine;

R. 1,1'-dimethyl-5-phenylsulfonyl-2-phenyl-3-indolo-thiazolo [4,5-b]quinolinocarbocyanine.

S. 2-ω-sulfobutyl-3-phenyl-4-[(1'-ethyl-3',3'-dimethyl-5'-phenyl-sulfonyl-indolin-2'-ylidene)-ethylidene]-2-isoxazolin-5-one-anhydrous-hydroxide.

The symmetrical cyanine dyes defined by formula [1], wherein $R = R_5 = -COC_6H_5$ or $-SO_2C_6H_5$, are prepared conveniently by reacting in the presence of a strong acid, mineral or organic (hydrochloric acid, hydrobromic acid, perchloric acid, p-toluene-sulfonic acid) and in a solvent medium, such as hot acetic anhydride: a) an indole derivative having the following formula:

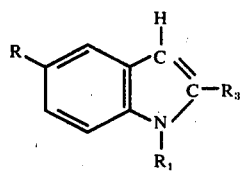

[3]

wherein: $R, R_1, R_3$ are as previously defined, with b. a condensing compound, such as β-anilino-acrolein-aldehyde-anil-hydrochloride in the proportion of about 2 moles of the compound (a) and at least one mole of the compound (b) and one mole of solvent. The crude dye obtained is purified by one or more recrystallizations from appropriate solvents.

To prepare the compounds having formula [3], not yet described in the literature, the cyclization of compounds having formula:

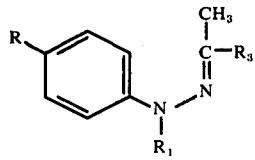

[4]

can be performed, according to the general methods used for the Fisher type synthesis of indoles (see for example: B. Robinson - Chem. Reviews 63 (1963) 373–401). $R, R_1$ and $R_3$ have the above-mentioned meanings.

The symmetrical dyes of formula [1], having an $R_4$ as substituent in the methine chain and $R = R_5 =$ benzoyl or phenyl-sulfonyl group, can be prepared by reacting equimolar proportions of an indole having formula:

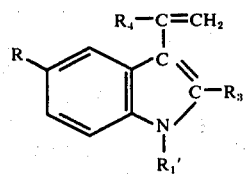

[5]

with an indole derivative having formula:

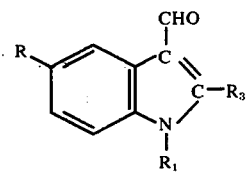

[6]

in the presence of a strong acid; $R, R_1, R_1', R_3$ and $R_4$ have the above-mentioned meanings.

The new compounds represented by formula [5] can be prepared according to the method described by M. Coenen et al. in U.S. Pat. No. 2,930,694 concerning the preparation of indole-carbocyanines substituted in their methine chain.

A compound represented by formula [6] can be prepared by reacting an indole-derivative having formula [3] with the Vilsmeier reagent (as described in Be 37, 2584 (1904) and in B.S.C.F.* 1962, 1989–1999) formed by dimethylformamide and phosphoryl chloride and prepared by adding the phosphoryl chloride to the dimethylformamide by cooling. The proportion is one mole of indole-derivative per mole of phosphoryl chloride. The indole compound is added to the reagent, thus prepared, and the mixture is kept under stirring at 35°–40° C for 30 or more minutes. The reaction mixture is poured into ice and water and neutralized with an aqueous alkaline solution. The mixture is heated for some minutes, then cooled and the formed solid is collected, washed with water and crystallized from a suitable solvent.

*Bull. Soc. Chem. France.

The asymmetrical cyanine dyes represented by formula [1], wherein $R_5$ is a substituent different from $—COC_6H_5$ and $—SO_2C_6H_5$, can be prepared by reacting an indole having formula [6] in equimolar amount with an indole having formula:

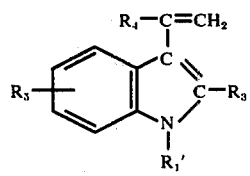

[7]

wherein: $R_1', R_3$ and $R_4$ are as previously defined and $R_5$ is equal to $R$ provided that $R_5$ cannot represent $—COC_6H_5$ and $—SO_2C_6H_5$.

The asymmetrical cyanine dyes having formula [2] can be prepared by reacting, in an inert solvent, such as for instance hot acetic acid or acetic anhydride, equimolar proportions of an indole-derivative having formula [6] with a heterocyclic compound having formula:

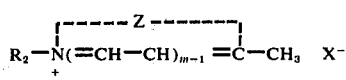

[8]

wherein:

$m, R_2, Z$ and $X^-$ are as previously defined.

Usually, the dyes can be purified by crystallization from a suitable solvent.

In another embodiment, the present invention refers to the dyes wherein the first heterocyclic nucleus is a 3,3-dialkyl-5-benzoyl-indolenine or a 3,3-dialkyl-5- phenylsulfonyl-indolenine joined to the methine linkage at the 2-position of the said nucleus; the second nucleus being a nucleus selected from the sensitizing or desensitizing nuclei joined to the other end of the methine chain. Desensitizing nuclei include for example those disclosed in U.S. Pat. No. 3,431,111 (Col. 1, line 60 — Col. 2, line 6) and F. M. Hamer, *The Cyanine Dyes and Related Compounds*, pp. 728–729.

In still another embodiment of the present invention, quaternized merocyanine dyes are provided comprising two nuclei joined together through a methine chain containing an equal number of alternating single said double bonds; the first of said nuclei is a 3,3-dialkyl-5-phenylsulfonyl-indolenine or a 3,3-dialkyl-5-benzoyl-indolenine joined to the methine chain at the 2-position and the other nucleus is a ketomethylenic nucleus having a reactice methylene group of the type described in, for example, U.S. Pat. No. 3,539,349.

In a further embodiment, the present invention relates to the styryl derivatives comprising a 3,3-dialkyl-5-benzoyl (or 5-phenylsulfonyl)-indolenine joined to a paraalkylamino benzene ring through a methine chain.

In a still further embodiment, the present invention refers to cyanine dyes containing two 5-benzoyl or 5-phenyl-sulfonyl-indolenine nuclei joined by a methine chain with alternating single and double bonds through the carbon atoms in 2-position of the heterocyclic rings. Said methine chain preferably consists of three methine groups.

The new dyes of the present invention derived from 3,3-dialkyl-5-benzoyl-indolenine or 3,3-dialkyl-5-phenylsulfonyl-indolenine include those represented by the following formulas:

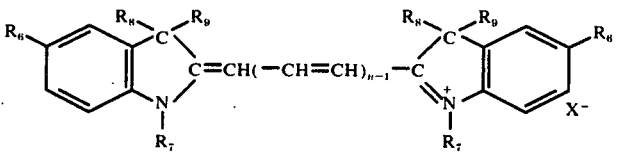 [9]

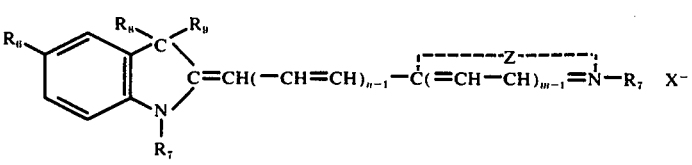 [10]

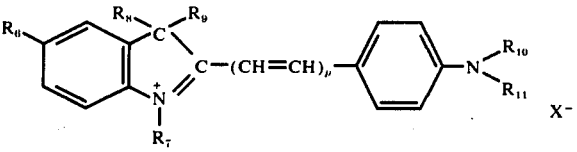 [11]

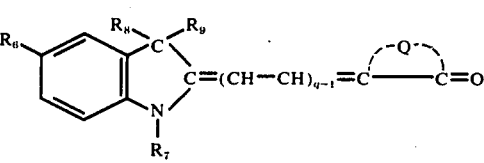 [12]

wherein:

$n$ represents a positive integer of from 2 to 4;
$m$ and $p$ each represents a positive integer of from 1 to 2;
$q$ represents a positive integer of from 1 to 3;
$R_6$ represents a group $-CO-C_6H_5$ and $SO_2-C_6H_5$;
$R_7$ represents an alkyl group, a cycloalkyl or substituted alkyl group preferably containing from 1 to 4 carbon atoms, such as for instance methyl, ethyl, propyl, isopropyl, butyl, hexyl, cyclohexyl, decyl, or dodecyl; an alkoxyalkyl group, such as for instance β-methoxy-ethyl or ω-butoxybutyl; an hydroxyalkyl group, such as for instance β-hydroxyethyl or ω-hydroxybutyl; a carboxyalkyl group such as for instance carboxymethyl, β-carboxyethyl, δ-carboxyropyl, ω-carboxybutyl; a sulfoalkyl group, such as for instance β-sulfoethyl, δ-sulfopropyl, δ-sulfobutyl, ω-sulfobutyl; a sulfatoalkyl group, such as for instance β-sulfatoethyl, or ω-sulfatobutyl; an acyloxyalkyl group, such as for instance β-acetoxyethyl, δ-propionyloxypropyl or ω-butyryloxybutyl; an alkoxycarbonylalkyl group, such as for instance β-methoxycarbonyl-ethyl or ω-methoxycarbonylbutyl; an alkenyl group, such as for instance allyl, 1-propenyl, 2-butenyl, etc.; an aryl group, such as for instance phenyl, tolyl, xylyl, chlorophenyl, methoxyphenyl, naphthyl; the general preferences described above for $R_1$ and $R_1'$ are applicable for $R_7$.

$R_8$ and $R_9$ each represents an alkyl group preferably containing from 1 to 4 carbon atoms, such as for instance methyl, ethyl, propyl, isopropyl, butyl, hexyl, decyl, or dodecyl;

$X^-$ represents an acid anion, such as for instance chloride, bromide, iodide, thiocyanate, sulfonate, perchlorate, p-toluenesulfonate, methyl or ethylsulfate, etc.;

$R_{10}$ and $R_{11}$ each represents the same or different alkyl groups containing from 1 to 6 carbon atoms, such as for instance methyl, ethyl, 2-cyano-ethyl, propyl, isopropyl, butyl, hexyl, etc.;

Z has the same meaning as reported in formula [2];

Q represents the non-metallic atoms required to complete a 5 to 6-membered heterocyclic nucleus, such as for instance a 2-pyrazolin-5-one nucleus (e.g., 3-methyl-1-phenyl-2-pyrazolin-5-one, 1-phenyl-2-pyrazolin-5-one, 1-(2-benzothiazolyl)-3-methyl-2-pyrazolin-5-one, etc.); an isoxazolone nucleus (e.g., 3-phenyl-5(4H)-isoxazolone, 3-methyl-5(4H)-isoxazolone, etc.), a pyrimidinedione nucleus (e.g., 3,4-dihydro-1-methyl-2,4-dioxo-2H-pyrido[1,2a]-pyrimidine, 3,4-dihydro-1-methyl-2,4-dioxo-2H-pyrimido, [2,1b] benzothiazole, etc.) Other useful ketomethylenic nuclei are described, for example, in U.S. Pat. No. 3,539,349)

According to the present invention, the dyes represented by formulas [9], [10], [11], [12] are prepared by reacting the new compounds of formula:

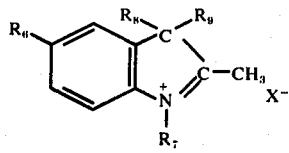   [13]

wherein:

$R_6$, $R_7$, $R_8$, $R_9$ have the above-mentioned meanings, or compounds derived therefrom, with suitable intermediates. The new compounds of formula [13] can be conveniently prepared by cyclization of the corresponding hydrazones, as already said for the compound of formula [3].

The symmetrical dyes having formula [9] can be prepared by reacting 2 moles of compounds having formula [13] with 1 mole or 1 mole + 100% excess of the ethoxymethylacetate or triethylorthoformiate to form carbocyanines ($n=2$), trimethoxypropene to form dicarbocyanines ($n=3$), 1-anilino-5-phenylimino-1,3-pentadiene hydrochloride to form tricarbocyanines ($n=4$). The reactions are preferably carried out in an inert solvent and in the presence of a basic condensing agent.

The unsymmetrical cyanine dyes of formula [10] wherein $n=2$ are prepared to advantage by reacting a compound having formula:

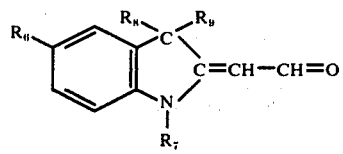   [14]

firstly prepared by the applicant, wherein $R_6$, $R_7$, $R_8$, $R_9$ have the above-mentioned meanings, with a compound selected from those represented by formula:

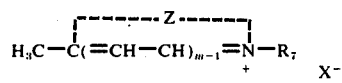   [15]

wherein:

$R_7$, Z, $X^-$, and $m$ are as previously defined. The condensation are carried out in the presence of acetic acid or acetic anhydride; the crude dye, obtained by cooling, is purified by one or more crystallizations from a suitable solvent.

The unsymmetrical dyes having formula [10] wherein $n=2, 3, 4$ are advantageously prepared by heating a mixture of a compound selected from those represented by formula [13] with a compound of formula:

$$R_{13}-N-(CH=CH)_{t-1}-C(=CH-CH)_{m-1}=\overset{+}{N}-R_7 \quad X^- \quad [16]$$
$$\underset{COR_{14}}{|}$$

wherein:

$t = 2, 3, 4$;

Z, $m$, $R_7$ and $X^-$ are as previously defined;

$R_{13}$ represents an aryl group (e.g., phenyl, tolyl, etc.);

$R_{14}$ represents an alkyl group having from 1 to 12 carbon atoms.

This reaction is preferably carried out in an inert solvent and in the presence of a basic condensing agent.

The styryl dyes of formula [11] can be prepared by heating a mixture of a compound of formula [13] with the appropriate N,N-disubstituted p-amino-benzaldehyde or N,N-di-substituted p-amino-cinnamaldehyde in a suitable solvent and in the presence of a basic condensing agent.

The quaternary merocyanine dyes represented by formula [12] are made to advantage by the reaction of a compound having formula [13] with a compound having formula:

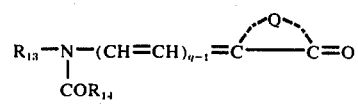   [17]

wherein $R_{13}$, $R_{14}$, $q$ and Q are as previously defined.

Particularly, our quaternary merocyanine dyes represented by formula [12] wherein $q = 2$ can be conveniently prepared by reacting a compound having formula [14] with a compound of formula:

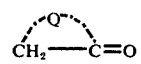   [18]

wherein: Q has the above-mentioned meanings.

The crude dyes are separated and purified by one or more recrystallizations from suitable solvents. The pure dyes are then quaternized by various methods well known in the art.

Finally, the intermediate compounds having formula [14] can be prepared according to J. D. Mee and D. W. Heseltine's method described in the British Pat. No. 1,199,798, starting from compounds having formula [13].

The following examples will better illustrate the present invention in its different aspects, viz. preparations of intermediates, dyes as well as their use in light-sensitive emulsions.

EXAMPLE 1

2-Phenyl-5-phenylsulfonyl-1H-indole.

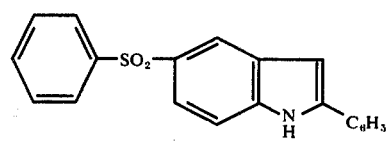

87 g. of 4-(acetophenone)-hydrazone-diphenylsulfone was completely mixed with 450 g. of anhydrous $ZnCl_2$ and then heated at 180° C. for 3 hours on a thermoregulated oil bath. The cake, thus obtained, was found in a mortar and poured under stirring into 4 l. of 20% hydrochloric acid. The product was collected on a filter and washed with water. The raw product was crystallized from ethyl alcohol, thus obtaining 46 g. of indole having a M.P. = 207°–208° C.

Percent analysis: C% — calculated 72.13; found 71.99;
H% — calculated 4.54; found 4.51;
N% — calculated 4.21; found 4.14;

EXAMPLE 2

2-Phenyl-5-benzoyl-1H-indole.

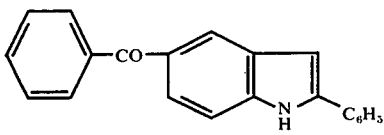

100 g. of 4-(benzoyl)-acetophenone-phenyl-hydrazone was mixed with 500 g. of anhydrous ZnCl₂ and then heated at 190° C. for 2 hours on a thermoregulated oil bath. The cake, thus obtained, was found in a mortar and poured under stirring into 4 l. of 20% hydrochloric acid. The solid obtained was extracted many times with ether; the ethereous extracts were treated with anhydrous CaCl₂ and evaporated to dryness. 17 g. of indole was obtained having a M.P. = 233° C.

Percent analysis: C% — calculated 84.72; found 83.84.
H% — calculated 5.08; found 5.16.
N% — calculated 4.71; found 4.71.

EXAMPLE 3

1-Methyl-2-phenyl-5-phenylsulfonyl-indole.

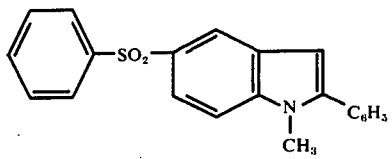

182 g. of 4-N-acetophenone-N'-methyl-hydrazone-diphenyl-sulfone was completely mixed with 750 g. of anhydrous ZnCl₂ and then heated at 160° C. per 4 hours on a thermoregulated oil bath. The pick cake obtained was found in a mortar and poured under stirring into 5 l. of 20% hydrochloric acid. The product was collected on a filter and repeatedly washed with water. The pure indole was extracted with ethyl ether, thus obtaining 42 g. of pure product having a M.P. = 165° C.

Percent analysis: C% — 76.20; found 72.59.
H% — calculated 4.93; found 5.01.
N% — calculated 4.03; found 4.08.

EXAMPLE 4

2-Phenyl-3-formyl-5-phenylsulfonyl-1H-indole.

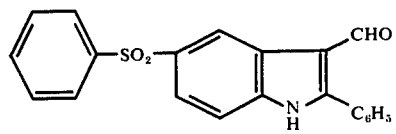

5 g. of 2-phenyl-5-phenylsulfonyl-1H-indole and 20 ml. of anhydrous dimethyl formamide were poured into a 250 ml. flask equipped with a mechanical stirrer, a reflux condenser and a dropping funnel. Vilsmeier's reagent was separately prepared by mixing 5 g. of phosphoryl chloride with 4.5 g. of anhydrous dimethyl formamide. This reagent was dropped into the indole solution maintaining the temperature under 40° C.; at the end of the addition, the mixture was kept at 45° C. for 45 minutes. After chilling at 20° C., the reaction mixture was poured into 500 ml. of water; the white solid, thus obtained, was collected on a filter and well washed with water. The raw product was purified by crystallization from acetic acid obtaining 2.5 g. of a pure product melting at 262° C.

Percent analysis: C% — calculated 69.70; found 69.30.
H% — calculated 4.18; found 4.29.
N% — calculated 3.87; found 3.85.

Example 5

2-Phenyl-3-formyl-5-benzoyl-1H-indole.

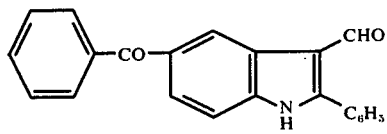

The product was obtained as described in Example 4, using 5 g. of 2-phenyl-5-benzoyl-1H-indole dissolved in 5 ml. of anhydrous dimethylformamide and 9 ml. of the Vilsmeir's reagent, obtained by mixing 4 ml. of phosphoryl chloride and 5 ml. of anhydrous dimethyl formamide. After recrystallization from acetic acid, 2.7 g. of pure product was obtained having a M.P. = 285° C.

Example 6

1,1'-dimethyl-2,2'-diphenyl-5,5'-diphenylsulfonyl-3,3'-indolocarbocyanine chloride.

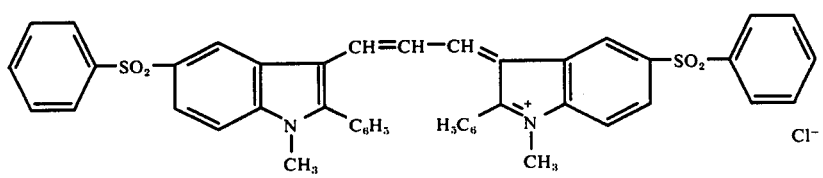

A mixture of 3.6 g. of 1-methyl-2-phenyl-5-phenylsulfonyl-indole and 1.25 g. of β-anilino-acroleinaldehyde-anil-hydrochloridrate in 20 ml. of acetic anhydride was refluxed adding 1 ml. of concentrated hydrochloric acid slowly. The mixture was heated to boiling for 3 minutes and then cooled. It was then poured into ethyl ether and the obtained dye was collected on a filter and dried. Yield: 3.3 g. (equal to 78% of the theoretical yield). After crystallization from hydrochloric acid acidified ethyl alcohol, a pure dye was obtained which had a M.P. = 177°–180° C.

λ max.: 586 nm. (dimethylformamide-ethyl alcohol).

EXAMPLE 7

1,1'-H-2,2'-diphenyl-5,5'-dibenzoyl-3,3'-indolocarbocyanine acetate.

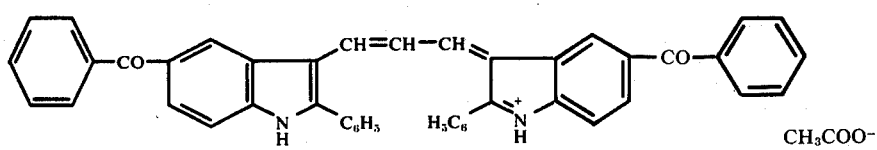

The dye was prepared as described in Example 6, using acetic acid instead of hydrochloric acid, starting from 1-H-2-phenyl-5-benzoyl-indole. M.P. = 250°–253.5° C. λ max. = 604 nm. (dimethylformamide-ethyl alcohol).

EXAMPLE 8

1-H-3'-ethyl-5-phenylsulfonyl-6'nitro-2-phenyl-3-indolothiacarbocyanine iodide.

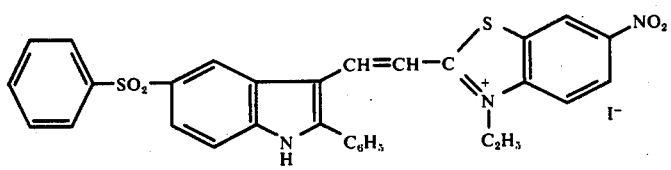

1.75 g. of 2-methyl-3-ethyl-6-nitro-benzothiazole iodide and 1.8 g. of 2-phenyl-3-formyl-5-phenylsulfonyl-1H-indole were dissolved in a mixture consisting of 20 ml. of acetic anhydride and 10 ml. of acetic acid. The reaction mixture was refluxed for 3 minutes and then cooled at room temperature. The raw dye was filtered on a buckner, washed with alcohol and ethyl ether and dried in a desicator at 50° C., thus obtaining 2.7 g. of a raw dye. It was then crystallized from a mixture consisting of 25 ml. of dimethylformamide and 25 ml. of ethyl alcohol. Yield: 1.12 g. of pure dye melting at 327–332° C. λ max. = 501 nm. (ethyl alcohol).

EXAMPLE 9

1-H-3'-ethyl-5-benzoyl-6'-nitro-2-phenyl-3-indolothiacarbocyanine iodide.

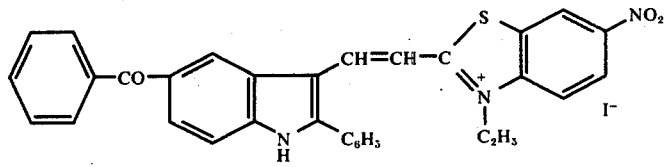

The synthesis was performed as described in Example 8, using 1.75 g. of 2-methyl-3-ethyl-6-nitro-benzothiazole iodide and 1.72 g. of 2-phenyl-3-formyl-5-benzoyl-indole. Yield: 2.5 g. of raw dye, which was

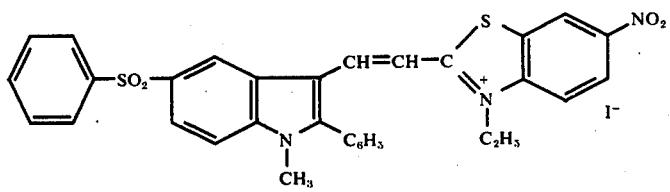

purified by recrystallization from a mixture of 40 ml. of dimethylformamide and 40 ml. of ethyl alcohol. 1.58 g. of pure dye was obtained having a M.P. = 198°–203° C. λ max. = 511 nm. (ethyl alcohol).

EXAMPLE 10

1-Methyl-3'-ethyl-5-phenylsulfonyl-6'-nitro-2-phenyl-3-indolothiacarbocyanine iodide.

The dye was prepared as described in Example 9, using 1.65 g. of 2-methyl-3-ethyl-6-nitro-benzothiazole iodide and 1.4 g. of 1-methyl-2-phenyl-3-formyl-5-phenylsulfonyl-indole. 1.0 g. of pure dye was obtained having a M.P. = 330° C. λ max.: 498 nm. (ethyl alcohol - dimethylformamide).

EXAMPLE 11

1-Methyl-1'-ethyl-5,5'-di-(phenylsulfonyl)-2-phenyl-3',3'-dimethyl-indocarbocyanine iodide.

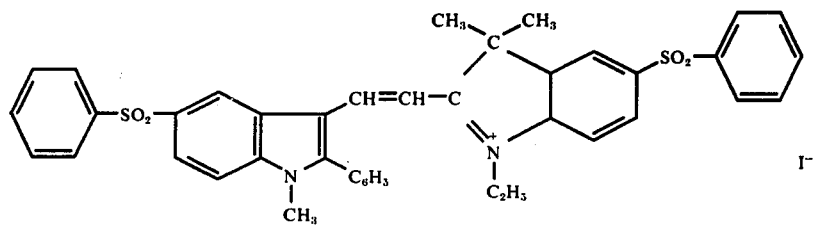

2.27 g. of 1-ethyl-2,3,3-trimethyl-5-phenylsulfonyl-indolenine iodide, 1.87 g. of 1-methyl-2-phenyl-3-formyl-5-phenylsulfonyl-indole and 15 ml. of acetic anhydride were mixed in a 50 ml. flask and heated to boiling for 30 minutes. The dye was separated from the reaction mixture upon cooling, filtered on a buckner and washed with ethyl alcohol, thus obtaining 2.3 of raw dye. After crystallization from 150 ml. of a mixture consisting of dimethylformamide/ethyl alcohol in a ratio of 1:2, by concentration to half volume and upon cooling 1.1 g. of pure dye was obtained. M.P. - 234°–5° C. λmax.: = 506 nm. (ethyl alcohol-dimethyl formamide).

EXAMPLE 12

1-Methyl-1'-ethyl-5-phenylsulfonyl-5'-benzoyl-2-phenyl-3',3'-dimethyl-indocarbocyanine iodide.

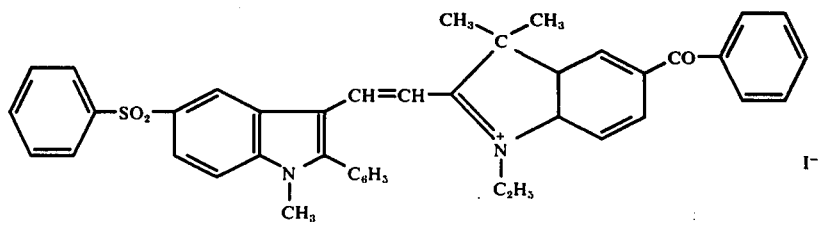

A mixture consisting of 2.09 g. of 1-ethyl-2,3,3-trimethyl-5-benzoyl-indolenine iodide, 1.8 g. of 1-methyl-2-phenyl-3-formyl-5-phenylsulfonyl-indole and 25 ml. of acetic anhydride was heated to boiling for 15 minutes. When still hot, the dye separated; it was then filtered, washed with ethyl alcohol and dried, thus obtaining 3.1 g. of raw dye which were then crystallized from 25 ml. of a mixture consisting of dimethylformamide/ethyl alcohol in a ratio of 1:1. Yield of pure dye: 2.47 g. M.P. = 200°–4° C. λ max.: 504 nm. (ethyl alcohol-dimethylformamide).

EXAMPLE 13

1-Cyanoethyl-1'-ethyl-3',3'-dimethyl-5,5'-di-(phenylsulfonyl)-2-phenyl-indocarbocyanine iodide.

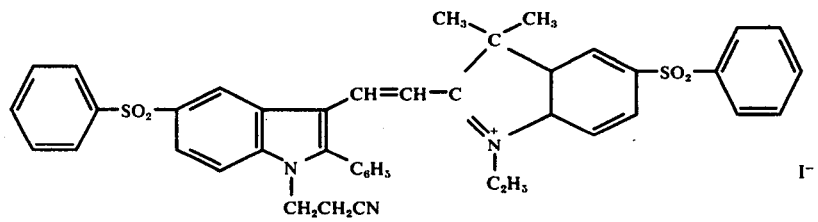

A mixture consisting of 1.13 g. of 1-ethyl-2,3,3-trimethyl-5-phenylsulfonyl-inodolenine iodide, 1.03 g. of 1-β-cyanoethyl-2-phenyl-3-formyl-5-phenyl-sulfonyl-indole and 10 ml. of acetic anhydride and 5 ml. of acetic acid were refluxed for 1 hour. The reaction mixture was poured into ethyl ether: a gum separated which was then hardened upon repeated washings with ethyl ether. The raw product was crystallized from a mixture of ethyl acetate and ethyl alcohol in a ratio of 1:1, concentrated under vacuum to half volume. Yield: 0.5 g.; M.P. - 233°–8° C. λ max,: 493 nm. (ethyl alcohol-dimethylformamide).

EXAMPLE 14

1-Methyl-2-phenyl-5-phenylsulfonyl-3'-Ω-sulfobutyl-6'-nitro-3-indolo-thiacarbocyanine-anhydrous-hydroxide.

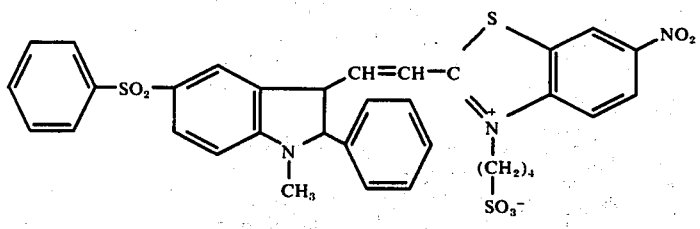

1.65 g. of 2-methyl-3-Ω-sulfobutyl-6-nitro-benzothiazole anhydrous hydroxide, 1.87 g. of 1-methyl-2-phenyl-3-formyl-5-phenylsulfonyl-indole and 20 ml. of acetic anhydride were heated to boiling for 10 minutes. When still hot, the dye separated; it was then filtered on a buckner and washed with ethyl alcohol and ethyl ether, thus obtaining 2.65 g. of the dye which were then crystallized from a mixture consisting of 100 ml. of ethyl alcohol, 100 ml. of dimethylformamide and 18 ml. of 48% hydrobromic acid. 1.5 g. of pure dye were obtained. M.P. > 330° C. λ max. = 507 nm. (ethyl alcohol-dimethyl-formamide).

EXAMPLE 15

1-Methyl-2-phenyl-1'-ω-sulfobutyl-5,5'-di-(phenylsulfonyl)-3',
3'-dimethyl-indocarbocyanine-anhydrous-hydroxide.

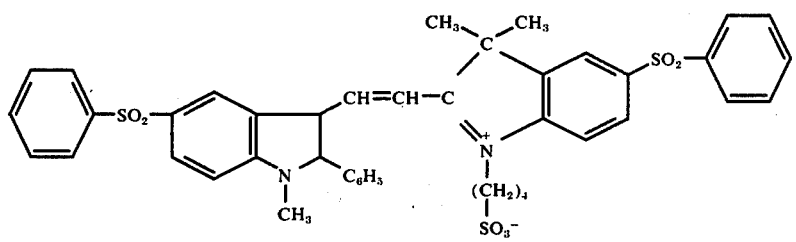

2.17 g. of 1-ω-sulfobutyl-2,3,3-trimethyl-5-phenylsulfonyl-indolenine anhydrous hydroxide, 1.87 g. of 1-methyl-2-phenyl-3-formyl-5-phenylsulfonyl-indole and 20 ml. of acetic anhydride were reacted as described in Example 10, thus obtaining 2 g. of raw dye which were then crystallized from a mixture consisting of ethyl alcohol-dimethyl-formamide in a ratio of 1:1 acidified with 48% HBr. 1 g. of pure dye was obtained. M.P. = 245°–252° C. λ max. — 496 nm. (ethyl alcohol-dimethyl formamide).

EXAMPLE 16

2,3,3-Trimethyl-5-phenylsulfonyl-indolenine.

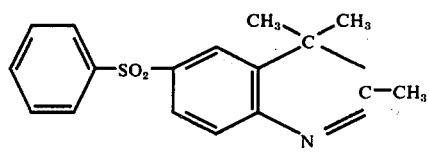

A mixture of 53.5 g. of anhydrous ZnCl₂ and 42 ml. of absolute ethyl alcohol was poured into a 250 ml. keller beaker provided with thermometer, mechanical stirrer, reflux condenser and gas inlet tube and heated up to a temperature of 120°–130° C. The obtained solution was cooled and the keller was put on an oil bath thermoregulated at 75° C. At this temperature, under stirring and bubbling with a slow stream of hydrogen, 26 g. of 4-methyl-isopropylketone-hydrazone-diphenylsulfone were added during 5 minutes. The hydrogen bubbling was continued for 3 hours keeping the reaction mixture at 85°–90° C. After cooling at 30° C., 45 ml. of 2% HCl was added under stirring. A solid product separated (Zn salt of the base). It was then filtered on a buckner and processed with 35 ml. of a 20% KOH water solution under stirring and heating up to about 80° C. After cooling at room temperature, a yellow product separated. This was then collected on a buckner and washed with water. The raw product was crystallized from ligroin, thus obtaining 14.2 g. of a base melting at 138°–140° C.

Percent analysis: C% — calculated 68.20; found 67.95.
H% — calculated 5.69; found 5.85.
N% — calculated 4.68; found 4.39.

EXAMPLE 17

2,3,3-Trimethyl-5-benzoyl-indolenine.

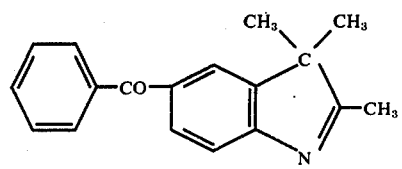

The base was prepared as described in Example 11, using 220 g. of anhydrous zinc chloride, 140 ml. of absolute ethyl alcohol, 95 g. of 4-methyl-isopropyl-ketone-hydrazone-benzophenone and 200 ml. of 2% HCl. The zinc salt of the base was treated with 150 ml. of 20% of a KOH aqueous solution. The base separated as an oil which was extracted with ether. the ethereal extracts were evaporated to dryness and the remaining liquid was purified by vacuum distillation. The product distilled from 183 to 185° C. at 0.5 mm. Hg. was collected. Yield: 46 g.

Percent analysis: C% — calculated 82.1; found 81.28.
H% — calculated 6.46; found 6.50.
N% — calculated 5.33; found 5.34.

EXAMPLE 18

1-Ethyl-2,3,3-trimethyl-5-phenylsulfonyl-indolenine p-toluene-sulfonate.

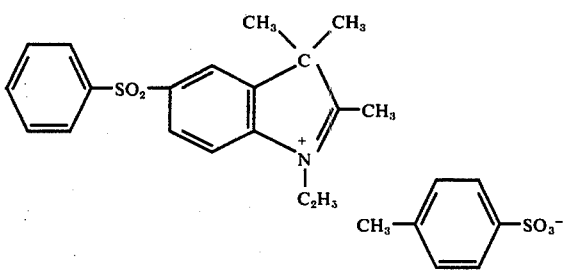

15 g. of 2,3,3-trimethyl-5-phenylsulfonyl-indolenine and 10 g. of ethyl p-toluene-sulfonate were heated at 115° C. for 8 hours in a pressure flask on a thermoregulated oil bath. The pick cake obtained by cooling was ground in a mortar washed with ether and dried.

Yield: 19.7 g. of salt having a M.P. 181°–188° C.

EXAMPLE 19

Anhydro-1-ω-sulfobutyl-2,3,3-trimethyl-5-phenylsulfonyl-indolenine hydroxide.

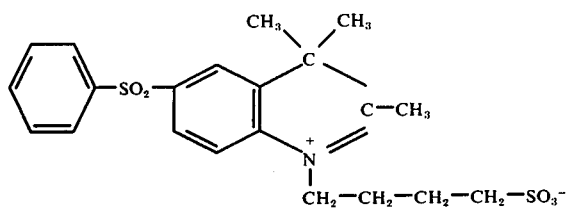

A mixture of 12 g. of 2,3,3-trimethyl-5-phenylsulfonyl-indolenine and 6.12 g. of 1,4-butansultone was heated at 120° C. for 3 hours. The solid cake obtained by cooling was ground in a mortar by washing repeatedly with ethyl ether. The product was dried in a desicator at 40° C., thus obtaining 16.3 g. of salt. The product was used as it was for the synthesis of the dyes.

EXAMPLE 20

Anhydro-1-ω-sulfobutyl-2,3,3-trimethyl-5-benzoyl-indolenine hydroxide.

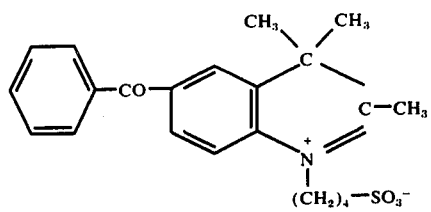

A mixture of 10.5 g. of 2,3,3-trimethyl-5-benzoyl-indolenine and 6.12 g. of 1,4-butanesulfone was heated at 120° C. for 3 hours. The pick cake obtained was ground in a mortar by washing repeatedly with ethyl ether. The product was dried in a desicator at 50° C., obtaining 7.1 g. of salt which were used without any further purification for the synthesis of the dyes.

EXAMPLE 21

1-Ethyl-2-formyl-methylene-3,3-dimethyl-5-phenylsulfonyl-indolenine.

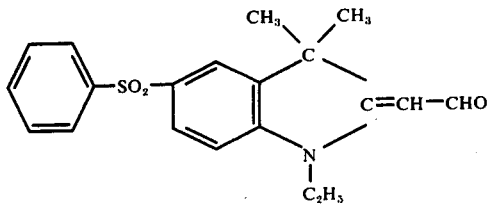

28 ml. of a mixture consisting of 10 ml. of phosphoryl chloride and 18 ml. of dimethyl-formamide was added to a solution made of 27 g. of 1-ethyl-2,3,3-trimethyl-5-phenylsulfonyl-indolenine iodide and 75 ml. of dimethyl-formamide. The mixture was heated on a water bath for 45 minutes and then poured into 900 ml. of ice and water. The mixture was rendered basic by the addition of 30% NaOH and then refluxed for 8 hours. Upon standing and cooling, a solid separated. It was collected on a buckner and washed with water until the washings were neutral. After a crystallization from a 1:1 ligroin-benzene mixture, 13.5 g. of pure product were obtained. M.P.: 175°–176.5° C.

Percent analysis: C% — calculated 67.66; found 67.61.

H% — calculated 5.96; found 6.02.

N% — calculated 3.95; found 3.85.

EXAMPLE 22

1-Ethyl-2,3,3-trimethyl-5-phenylsulfonyl-indolenine iodide.

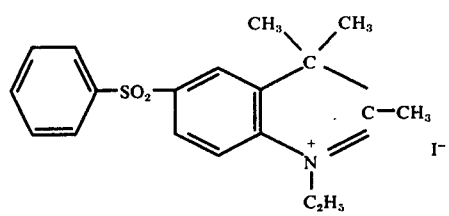

A mixture of 60 g. 2,3,3-trimethyl-5-phenylsulfonyl indolenine and 36 ml. of ethyl iodide was heated at 110° C. for 8 hours on a thermo-regulated oil bath. After cooling the pick cake obtained was ground in a mortar by washing with acetone and ethyl ether and then dried in a desicator at 50° C. 36.7 g. of product were obtained. M.P.: 210°–213° C.

Percent analysis: C% — calculated 50.1; found 49.5.

H% — calculated 4.87; found 4.80.

N% — calculated 3.08; found 3.19.

EXAMPLE 23

1-Ethyl-2,3,3-trimethyl-5-benzoyl-indolenine p-toluene-sulfonate.

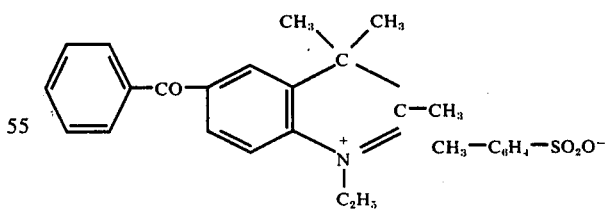

A mixture of 2.63 g. of 2,3,3-trimethyl-5-benzoyl-indolenine and 2.4 g. of ethyl p-toluene-sulfonate was heated at 120° C. for 8 hours in a pressure flask on a thermoregulated oil bath. The cake obtained by cooling was ground in a mortar by washing with ethyl ether, dried under vacuum and used immediately for dye snythesis because it was deliquescent.

EXAMPLE 24

1,1'-Diethyl-3,3,3',3'-tetramethyl-5,5'-diphenylsulfonyl-indocarbocyanine iodide.

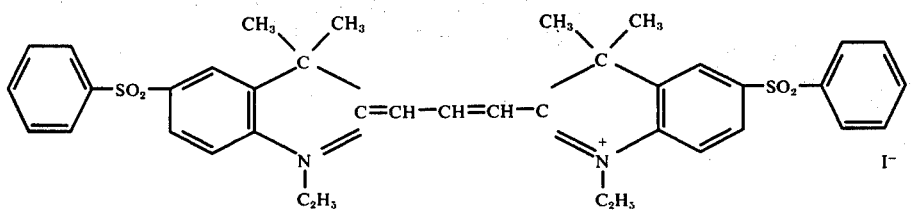

A mixture of 1-ethyl-2,3,3-trimethyl-5-phenylsulfonyl-indolenine iodide and 12 ml. of triethylorthoformiate in 60 ml. of pyridine was heated to reflux for 6 hours. After cooling, the mixture was poured into ethyl ether under stirring; the separated gum became solid upon repeated washings with ether. After crystallization from ethyl alcohol, 1.3 g. of pure dye were obtained, having a M.P.: 270°–275° C. (decomposition). λ max. = 556 nm. (ethyl alcohol).

The 1,1'-di(omega-sulfo)-propyl derivative of this dye was prepared as follows:

A mixture of 4.2 g. of anhydro-1-(omega-sulfo)-propyl-2,3,3-trimethyl-5-phenylsulfonyl-indolenine-hydroxide in 15 ml. of dimethylformamide and 6 ml. of triethylorthoformiate was relfuxed for 25 minutes. After cooling the reaction mixture was poured into ethyl ether. The gum which separated was washed with ethyl ether and then dissolved in a mixture of ethyl alcohol and dimethyl formamide. The dye separated upon cooling on a buchner. Yield: 0.8 g. M.P. 288°–293° C λ max.: 559 nm. (methyl alcohol and dimethylformamide).

EXAMPLE 25

1,1'-diethyl-3,3,3',3'-tetramethyl-5,5'-dibenzoylindocarbocyanine iodide.

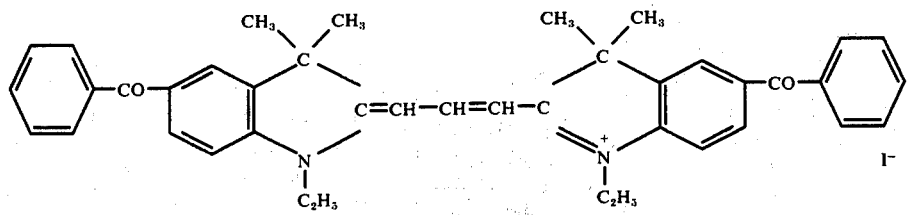

The dye was prepared as described in Example 19 using 1.4 g. of 1-ethyl-2,3,3-trimethyl-5-benzoyl-indolenine iodide, 2 ml. of triethylorthoformiate and 5 ml. of pyridine. The raw dye was purified by crystallization from ethyl alcohol, obtaining 0.4 g. of pure dye having a M.P. = 295°–298° C. λ max. = 563 nm. (ethyl alcohol).

EXAMPLE 26

1,3'-diethyl-5-phenylsulfonyl-6'-nitro-3,3-dimethyl-indo-thiacarbocyanine iodide.

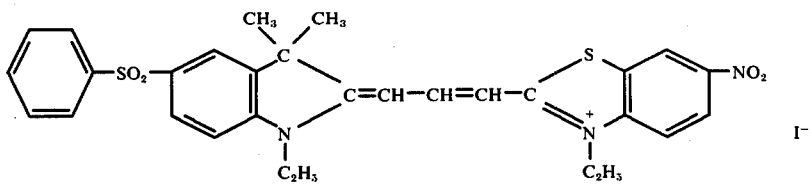

A mixture of 1.77 g. of 1-ethyl-2-formylmethylene-3,3-dimethyl-5-phenylsulfonyl-indoline and 1.75 g. of 2-methyl-3-ethyl-6-nitrobenzothiazole iodide in 30 ml. of acetic anhydride and 15 ml. of acetic acid was heated to reflux for 5 minutes. By cooling, the dye separated as green crystals with golden reflexes; it was then collected on a buckner, washed with ethyl alcohol and ethyl ether and dried in a desicator at 50° C. after crystallization from 12.5 ml. of dimethylformamide, 1.3 g. of pure dye were obtained having a M.P.: 240°–245° C. λ max. = 563 nm. (ethyl alcohol).

EXAMPLE 27

1,3'-Diethyl-5-phenylsulfonyl-3,3-dimethyl-indooxacarbocyanine iodide.

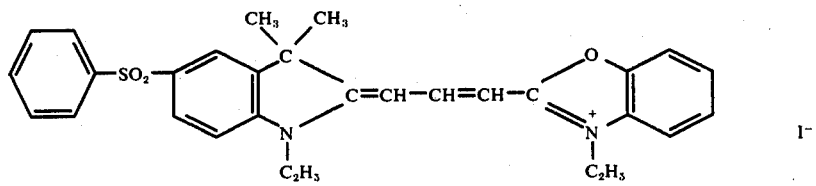

A mixture of 1.77 g. of 1-ethyl-2-formylmethylene-3,3-dimethyl-5-phenylsulfonyl-indoline and 0.87 g. of 2-methyl-3-ethyl-benzoxazole iodide in 15 ml. of acetic anhydride was heated to reflux for 5 minutes. The reaction mixture, poured into ethyl ether, separated a gum, which became solid upon repeated washings with ethyl ether. The raw dye was collected on a bunkner and dried in a desicator at 50° C. After a crystallization from 15 ml. of a 1:2 dimethylformamide ethyl alcohol mixture, 1.5 g. of pure dye were obtained having a M.P. = 178°–181° C. λ max. = 537 nm. (ethyl alcohol).

EXAMPLE 28

Anhydro-1-ω-sulfobutyl-3′-ethyl-5-phenylsulfonyl-6′-nitro-3,3-dimethyl-indo-thiacarbocyanine hydroxide.

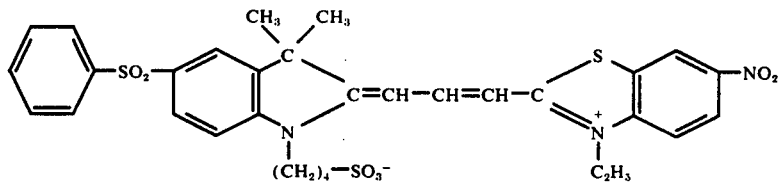

A mixture of 4.3 g. of anhydro-1-ω-sulfobutyl-2,3,3-trimethyl-5-phenylsulfonyl-indolenine and 2.5 g. of 2-formylmethylene-3-ethyl-6-nitro-benzothiazoline in a mixture of 25 ml. of acetic anhydride and 12.5 ml. of acetic acid was heated to reflux for 10 minutes. After cooling, the reaction mixture was poured into ethyl ether under stirring. The separated solid was collected on a buckner and washed immediately with many portions of ethyl ether. The raw dye was boiled twice in 100 ml. of ethyl acetate and crystallized from 25 ml. of acetic acid, thus obtaining 3 g. of a pure dye melting at 308°–311° c. λ max. = 566 nm. (ethyl alcohol).

EXAMPLE 29

Anhydro-1-ω-sulfobutyl-3′-ethyl-5-benzoyl-6′-nitro-3,3-dimethyl-indo-thiacarbocyanine hydroxide.

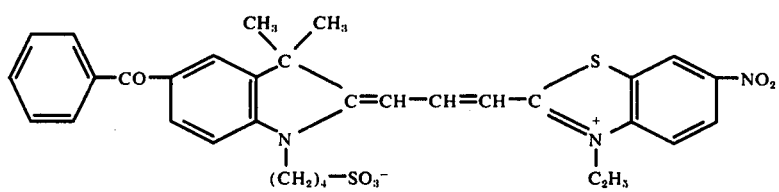

A mixture of 1.5 g. of anhydro-1-ω-sulfobutyl-2,3,3-trimethyl-5-benzoyl-indolenine hydroxide and 1.2 g. of 2-formylmethylene-3-ethyl-6-nitro-benzothiazoline in a mixture of 20 ml. of acetic anhydride and 7 ml. of acetic acid was heated to reflux for 15 minutes. After cooling, the reaction mixture was poured into ether under stirring; a solid dye separated after a night standing. The dye was then filtered on a buckner and washed with ethyl ether. The yield of the raw dye was 2.37 g. which were crystallized from ethyl alcohol, thus obtaining 1.0 g. of pure dye. M.P. = 240°–248° C. λ max. = 572 nm. (ethyl alcohol). λ max. = 559 nm (methyl alcohol + dimethylformamide)

EXAMPLE 30

3-Phenyl-1-[(1′-ethyl-3′,3′-dimethyl-5′-phenylsulfonyl-indolenine-2′-ylidene)-ethylidene]-2-isoxazoline-5-one.

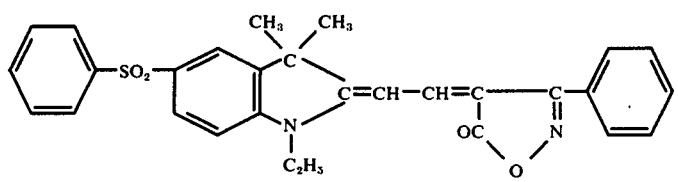

1.7 g. of 1-ethyl-2,3,3-trimethyl-5-phenylsulfonyl-indolenine p-toluene-sulfonate and 0.9 g. of 0.9 g. of 3-phenyl-4-anilino-methylene-2-isoxazoline-5-one were dissolved in 15 ml. of pyridine containing 2 ml. of triethylamine and refluxed at 130° C. for 16 hours. After cooling, the reaction mixture was poured into 200 ml. of water acidified with acetic acid. The separated gum was washed many times with water, dissolved in acetic acid and precipitated with water. The dye, which separated, was used directly to prepare the dye of Example 31.

EXAMPLE 31

2-Ethyl-3-phenyl-4-[(1′-ethyl-3′,3′-dimethyl-5′-phenylsulfonyl-indoline-2-ylidene)-ethylidene]-2-isoxazoline-5-one iodide.

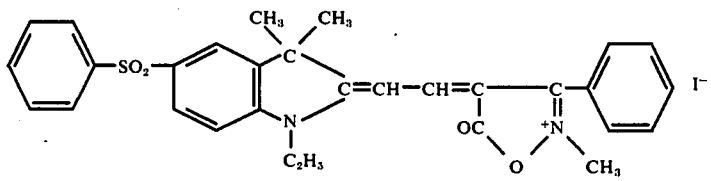

2.49 g. of the merocyanine of Example 30 and 7.5 ml. of diethylsulfate were reacted at 120° C. for 15 minutes. After cooling, the gum, thus obtained, was washed repeatedly with 50 ml. portion of ethyl ether. The product, thus obtained, was dissolved in 20 ml. of ethyl alcohol and 1.6 g. of potassium iodide, dissolved in 5 ml. of water, added thereto. The separated gum became solid upon repeated washings with water. The raw product was crystallized from ethyl alcohol, thus obtaining 1.3 g. of pure dye. M.P. = 219°–224° C. λ max. = 462 nm. (ethyl alcohol).

EXAMPLE 32

1-Ethyl-2-[3-(2,5-dimethyl-1-phenyl-3-pyrrolyl)-vinyl]-3,3-dimethyl-5-phenylsulfonyl-indolenine perchlorate.

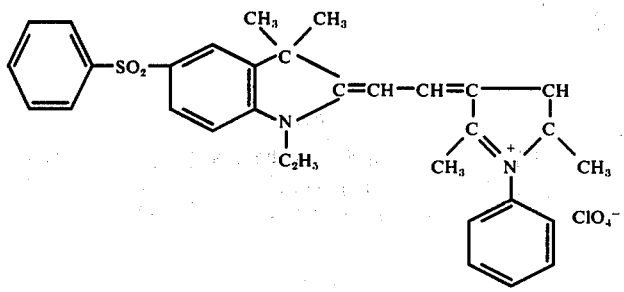

A mixture of 1.5 g. of 1-ethyl-2,3,3-trimethyl-indolenine p-toluene-sulfonate and 0.59 g. of 1-phenyl-2,5-dimethyl-3-formylpyrrole (prepared as described in British Pat. No. 746,998) in 15 ml. of boiling ethyl alcohol was added with 0.5 ml. of acetic anhydride and refluxed for 4 hours. 0.5 g. of ammonium perchlorate dissolved in water was added to the hot reaction mixture. The raw dye separated upon cooling. It was then dried in a desicator at 50° C. and crystallized from a 3:1 ethyl alcohol-dimethylformamide mixture, thus obtaining 0.4 g. of pure dye. M.P. = 268°–271° C. λ max. = 494 nm. (ethyl alcohol).

EXAMPLE 33

1-Methyl-1'-ethyl-2-phenyl-5-nitro-5'-phenylsulfonyl-3',3'-dimethyl-indocarbocyanine iodide.

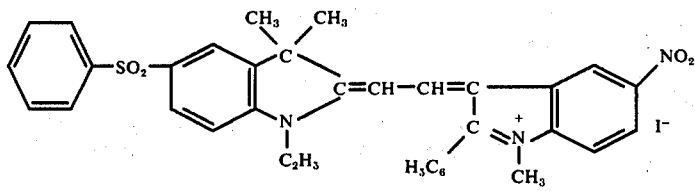

A mixture of 1.87 g. of 1-ethyl-2,3,3-trimethyl-5-phenylsulfonyl-indolenine p-toluene-sulfonate and 1.5 g. of 1-methyl-2-phenyl-3-aldehydo-5-nitro-indole (prepared as described in French Pat. No. 1,599,796) in a mixture consisting of 15 ml. of acetic anhydride and 7.5 ml. of acetic acid was refluxed for 5 minutes. After cooling, the mixture was poured into ether. A gum separated. It was then redissolved with 20 ml. of hot ethyl alcohol and precipitated with 0.6 g. of potassium iodide dissolved in water. The dye separated upon heating up to the boiling point and further cooling of the precipitation. The dye was then dried in a desicator at 50° C. Yield: 1.6 g. The raw dye was crystallized from 25 ml. of a 1:1 dimethylformamide-ethyl alcohol, thus obtaining 0.5 g. of pure dye. M.P. = 268°–271° C. λ max. = 507 nm. (ethyl alcohol dimethylformamide).

EXAMPLE 34

1-Ethyl-3,3-dimethyl-1'-methoxy-2'-phenyl-5-phenylsulfonyl-indocarbocyanine perchlorate

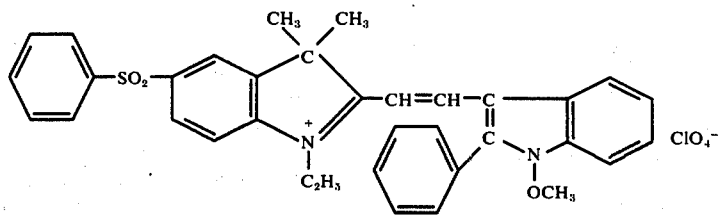

A mixture consisting of 3.7 g. of 1-methoxy-2-phenyl-3-formyl-indole, 6.8 g. of 1-ethyl-2,3,3-trimethyl-5-phenylsulfonyl-indolenine p-toluene-sulfonate and 30 ml. of acetic anhydride was refluxed for 2 minutes. After cooling, the mixture was poured into 500 ml. of ethyl ether: a greenish gum separated. It was then dissolved in 75 ml. of pure methanol and 3 ml. of 5% HClO₄ further added thereto. The solution was refluxed for 2 minutes and then left to cool at room temperature, thus obtaining the separation of 2.6 g. of dye. The product was filtered on a goock filter and washed with 100 ml. of ethanol. The raw dye, thus obtained, was recrystallized from 50 ml. of ethanol acidified with 0.5 ml. of 60% perchloric acid. Yield of pure dye: 1.25 g. M.P. = 222°–4° C. λ max.: 515 nm. (ethyl alcohol).

EXAMPLE 35

1-Methyl-1'-ethyl-2-phenyl-5-nitro-5'-benzoyl-3',3'-dimethyl-indocarbocyanine iodide

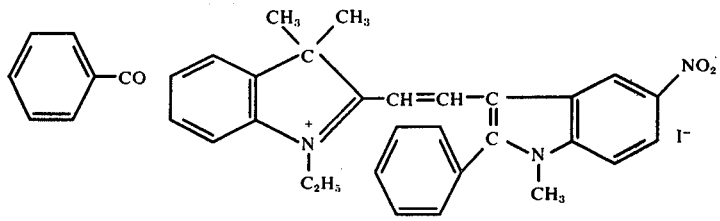

2.09 g. of 1-ethyl-2,3,3'-trimethyl-5-benzoyl-indolenine iodide, 1.4 g. of 1-methyl-2-phenyl-3-formyl-5-nitro-indole and 15 ml. of acetic anhydride were heated to boiling for 15 minutes. When still hot, the dye separated; it was then filtered and washed with ethyl alcohol. The raw dye, thus obtained, was crystallized from a mixture of dimethylformamide and ethyl alcohol. The raw dye, thus obtained was crystallized from a mixture of dimethylformamide and ethyl alcohol in a ratio of 1:3. 0.87 g. of pure dye was obtained. M.P.: 245°–7° C. λ max.: 505 nm. (ethyl alcohol-dimethylformamide).

EXAMPLE 36

1-Methyl-1'-ω-sulfo-butyl-2-phenyl-5-nitro-5'-phenylsulfonyl-3',3'-dimethylindocarbocyanine anhydrous hydroxide

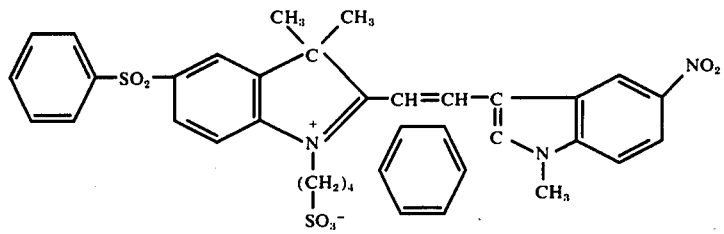

A mixture consisting of 2.17 g. of 1-ω-sulfobutyl-2-methyl-3,3'-dimethyl-5-phenylsulfonyl-indolenine anhydrous hydroxide, 1.4 g. of 1-methyl-2-phenyl-3-formyl-5-nitro-indole and 15 ml. of acetic anhydride was refluxed for 10 minutes. When still hot, the dye separated; it was then filtered on a buckner and washed with ethyl alcohol and ethyl ether, thus obtaining 2.7 g. of raw dye which were crystallized from 75 ml. of dimethylformamide. 1.6 g. of pure dye was obtained. M.P. = 273°–6° C. λ max.: 507 nm. (ethyl alcohol-dimethylformamide).

EXAMPLE 37

(1-Ethyl-3,3'-dimethyl-5-phenylsulfonyl-indolenine-2)-(1',3'-diallyl-imidazo-[4,5-b]-quinoxaline-2)-trimethincyanine p-toluene-sulfonate

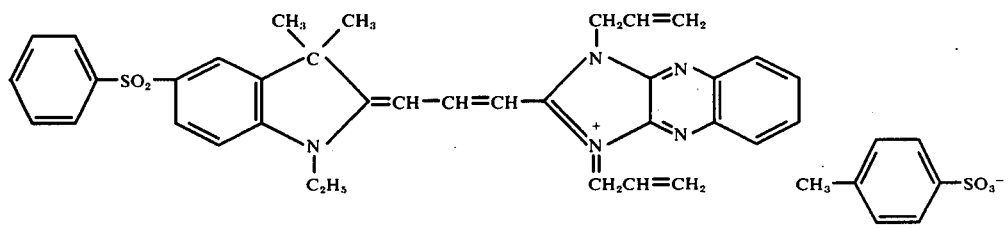

A mixture consisting of 3.55 g. of 1-ethyl-2-formylmethylen-3,3-dimethyl-5-phenylsulfonyl-indolenine and 4.36 g. of 1,3-diallyl-2-methyl-imidazo[4,5-b]-quinoxaline p-toluene-sulfonate and 20 ml. of acetic anhydride was heated to boiling for 10 minutes. The reaction mass was cooled and then poured into ethyl ether and left to stand for 1 night. A gum separated. It was hardened upon repeated washings with ethyl ether. The raw product, thus obtained, was crystallized from very little ethyl alcohol, thus obtaining shining crystals which were gathered in a mortar, ground under ethyl alcohol and dried under vacuum. 2 g. of pure dye were obtained. M.P.: 260°–265° C. λ max.: 558 nm. (ethyl alcohol).

EXAMPLE 38

Anhydro-1-(ω-sulfo)-butyl-2-p-diethylamino-styryl-3,3-dimethyl-5-benzoyl-indolenine hydroxide.

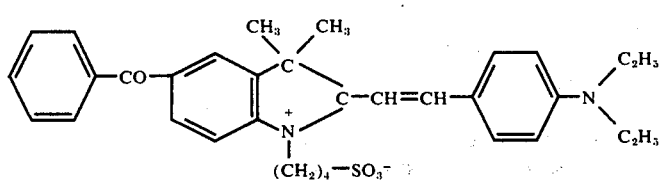

A mixture of 3.99 g. of anhydro-1-ω-sulfobutyl-2,3,3-trimethyl-5-benzoyl-indolenine hydroxide and 1.77 g. of p-diethylaminobenzaldehyde in a mixture consisting of 20 ml. of acetic anhydride and 10 ml. of acetic acid was heated to boiling for 10 minutes. After cooling, the dye was precipitated with ethyl ether; the separated gum became solid upon repeated washings with ether. The raw dye was collected on a buckner and crystallized from ethyl alcohol, thus obtaining 3 g. of pure dye, M.P. = 179°–183° C. λ max. = 579 nm. (ethyl alcohol).

EXAMPLE 39

Anhydro-1-ω-sulfobutyl-2-p-diethylamino-styryl-3,3-dimethyl-5-phenylsulfonyl-indolenine hydroxide.

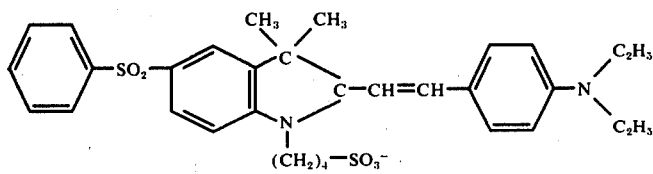

The dye was obtained as described in Example 38 using 4.35 g. of anhydro-1-ω-sulfobutyl-2,3,3-trimethyl-5-phenylsulfonyl-indolenine hydroxide and 1.77 g. of p-diethylamino-benzaldehyde. After crystallization from ethyl alcohol, the pure dye had a M.P. equal to 188°–192° C. Yield: 1.5 g. λ max. = 578 nm. (ethyl alcohol).

EXAMPLE 40

2-Diphenylamino-5-[(1-ethyl-3,3-dimethyl-5-phenylsulfonyl-indoline-2-ylidene)-ethylidene]-2-thiazoline-4-one.

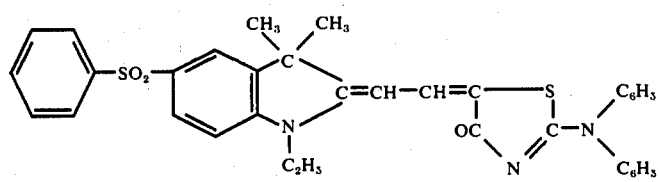

A mixture consisting of 1.77 g. of 1-ethyl-2-formylmethylene-3,3-dimethyl-5-phenylsulfonyl-indoline, 1.34 g. of 2-diphenylaminothiazoline-4-one and 15 ml. of piperidine was heated to reflux for 20 minutes. The dye separated upon cooling. It was then filtered on a buckner, washed with ethyl alcohol and ether and crystallized from a 1:1 ethyl alcohol-dimethylformamide mixture. Yield of the pure dye: 1.9 g. M.P. = 275°–280° C. λ max. = 458 nm. (ethyl alcohol-dimethylformamide).

The dyes of the present invention are powerful desensitizers for light-sensitive silver halide emulsions and therefore can be used in those photographic elements wherein desensitization is required, such as for instance in the manufacture of emulsions used for the production of direct positive images, as described by Kendall and col. in U.S. Pat. No. 2,541,472 or in U.S. Pat. No. 2,669,515 and by Hillson and col. in U.S. Pat. No. 3,062,651, etc.

The cyanine dyes of this invention, such as for instance those represented by Examples 9, 10, 11, 12, 13, 14, 15, 24, 25, 26, 28, 29, 31, 33, 34, 35, 36, 37 are useful electron acceptor spectral sensitizers for direct positive emulsions, since the direct positive emulsions, which contain them, have an improved sensitivity.

To prepare photographic emulsions, the dyes according to the present invention are conveniently incorporated into the finished emulsions and of course uniformly distributed throughout the emulsion. The methods of incorporating the dyes into the emulsions are quite easy and well known to those skilled in the art. It is convenient to add the dyes e.g. in the form of solutions with a suitable solvent selected from among those having no harmful effect upon the finished emulsion. Methanol, ethanol, isopropyl alcohol, pyridine, etc., alone or in combination, are useful solvents to dissolve the dyes according to the present invention.

The emulsions to be used with the new dyes of this invention can be all those prepared using natural hydrophylic colloids as silver halide dispersing media, such as gelatin, albumin, agar-agar, arabic gum, synthetic alginic acids, such as for instance polyvinyl alcohol, polyvinyl pyrrolidone cellulose esters, partially hydrolized cellulose acetate, etc.

The concentration of the new dyes in the emulsion may largely vary; from 10 to 1000 mg. per mole of silver halide. The specific concentration will vary according to the type of the emulsion to be used and according to the required effects.

The most convenient concentration of the dye for each given emulsion can be easily determined by making concentration series and relative measurements and examinations which are well-known to those skilled in the art. The emulsion containing the dyes according to this invention can be conveniently coated on any support material used for the production of photographic materials, such as paper, glass, cellulose acetate, cellulose nitrate, film-forming synthetic resins, polyesters, polyamides, polystyroles, etc.

To prepare a silver halide emulsion desensitized with one of our dyes, we proceeded in the following way: a number of dyes according to the present invention were separatedly incorporated in an emulsion in a ratio of 12 or 24 or 36 mg. of dye per Kg. of emulsion. The dyes were added in the form of solutions and uniformly incorporated throughout the emulsion under stirring. Sometimes, higher or lower concentrations may be necessary to ensure the desired degree of desensitization.

Our invention is further illustrated by the following table I which reports the relative sensitivity data (desensitization) expressed as log It (*) produced in silver halide emulsions of the bromo-iodide and chloro-bromide type by the dyes of the present invention, added to the emulsion in the above mentioned way.

(*) Minus sign means lower sensitivity.

After digestion at 50° C. for 10', the emulsions were coated on a cellulose acetate film support. A comparison test coating was made of each emulsion containing no desensitizing dye. A sample of each coating was exposed to a sensitometer and in a spectrograph and then developed in the Ferrania R6 developer, for 6 minutes at 20° C., having the following composition:

| | |
|---|---|
| Metol | 1 g. |
| Sodium sulfite, anhydrous | 25 g. |
| Hydroquinone | 3.5 g. |
| Sodium carbonate, anhydrous | 25 g. |
| Potassium bromide | 0.7 g. |
| Water to make | 1,000 ml. |

(when the emulsion was of the chloro-bromide type) and with the Ferrania R18 developer, for 12 minutes at 20° C., having the following composition:

| | |
|---|---|
| Metol | 2 g. |
| Sodium sulfite, anhydrous | 100 g. |
| Hydroquinone | 5 g. |
| Borax | 2 g. |
| Water to make | 1,000 ml. |

(when the emulsion was of the bromo-iodide type).

TABLE I

| Dye Example No. | Dye Concentration mg/Kg. em. | Emulsion Type | Relative Sensitivity Expressed in log It |
|---|---|---|---|
| without any dye addition | — | bromo-iodide | TEST |
| 6 | 24 | ″ | − 0.03 |
| 7 | ″ | ″ | − 0.03 |
| 24 | 12 | ″ | − 0.66 |
| 24 | 24 | ″ | − 1.10 |
| 24 | 36 | ″ | − 2.13 |
| 26 | 24 | ″ | − 1.53 |
| 32 | ″ | ″ | − 1.0 |
| 38 | ″ | ″ | − 0.63 |
| 39 | ″ | ″ | − 0.65 |
| without any dye addition | — | chloro-bromide | TEST |
| 6 | 24 | ″ | − 0.03 |
| 7 | ″ | ″ | − 0.05 |
| 24 | ″ | ″ | − 0.65 |
| 24 | 36 | ″ | −0.84 |
| 26 | 24 | ″ | − 0.88 |
| 32 | ″ | ″ | − 0.13 |
| 38 | ″ | ″ | − 0.08 |
| 39 | ″ | ″ | − 0.07 |

The used bromo-iodide emulsion contained 96% bromide and 4% iodide and the chloro-bromide one, 89.2% chloride and 10.8% bromide. From the data of table I, we can see that some representative dyes of this invention cause a desensitization of more than 90% in the emulsions containing such dyes. We can give evidence in the same way that also the other dyes of the present invention are silver halide emulsion desensitizers. Though both emulsions selected for our tests are made of silver halide and gelatin, it should be understood that the desensitizers of the present invention can be used to advantage in emulsions wherein gelatin is substituted with hydrophylic colloids, of the type mentioned above as possible or partial substitutes of gelatin.

The dyes according to the present invention are useful electron acceptor spectral sensitizers which can be used in all types of direct positive emulsions.

According to the present invention, improved direct positive emulsions can be obtained by introducing one or more cyanine dyes of this invention into a suitable fogged silver halide emulsion. The emulsion can be fogged in any way known to those skilled in the art, such as for instance by means of light, or of chemical fogging agents, such as for instance stannous chloride, formaldehyde, thiourea dioxide, and the like. The emulsions can be fogged also by addition of a reducing agent, such as those described above, and of a metal more electropositive than silver such as a gold salt, for instance potassium chloro-aurate, as described in the British Pat. No. 723,019.

The dyes of this invention can be incorporated also in direct positive emulsions of the type wherein halide grains have a silver salt central core insoluble in water and an outer shell consisting of a fogged silver salt insoluble in water which can be developed to metallic silver without any exposure. The dyes according to the present invention are preferably incorporated into the fogged outer shell. These emulsions can be prepared in several ways, such as for instance as described in U.S. Pat. No. 3,367,778.

The dyes according to the present invention are electron acceptor spectral sensitizers which can be used also in high-sensitivity direct positive emulsions, such as those described in U.S. Pat. No. 3,501,307.

The silver halides used for the preparation of the direct positive photograhic emulsions, according to this invention, comprise any type of silver halides, such as for instance silver bromide, silver iodide, silver chloride, silver chloro-iodide, silver bromo-iodide, silver bromo-chloride, and the like.

The silver halide grains may be regular and of every crystalline shape, such as cubical or octahedral shape, as described in U.S. Pat. No. 3,501,306. Such grains advantageously have a narrow distribution curve, as described in U.S. Pat. No. 3,501,305. It is further known that emulsions having silver halide grains with an averge diameter lower than 1 $\mu$. preferably 0.5 $\mu$, are particularly useful.

The direct positive emulsions sensitized with the dyes according to the present invention may also contain color-formers dissolved in the layer in an appropriate solvent or added as dispersions in a crystalloidal solvent, such as for instance di-n-butylphthalate, tricresylphosphate, etc.

A certain number of dyes of the present invention were photographically tested as electron acceptors spectral sensitizers for fogged direct positive emulsions by adding the sensitizers dissolved in a suitable solvent in the concentration, reported in table II, of mg. of the dye per pole of Ag.

The final emulsion, ready to be coated, had a pH = 6 and a pAg = 8.5. After having been coated, a sample of each coating was exposed in a sensitometer and in a spectrograph using a tungsten lamp, developed at 20° C. for 3 minutes with the Kodak D-19b developer having the following composition:

| | |
|---|---|
| Metol | 2.2 g. |
| Sodium sulfite, anhydrous | 72 g. |

-continued

| Hydroquinone | 8.8 g. |
| Sodium carbonate, anhydrous | 48 g. |
| Potassium bromide | 4 g. |
| Water to make | 1,000 ml. | then fixed, washed and dried. The results thereof are reported in table II. The same emulsion containing the same quantity of yellow-pinacryptole as electron acceptor was taken as a reference test. The sensitivity is expressed in log It relative to the yellow-pinacryptole containing coating which is taken as a reference. Minus sign means lower sensitivity and plus sign means higher sensitivity.

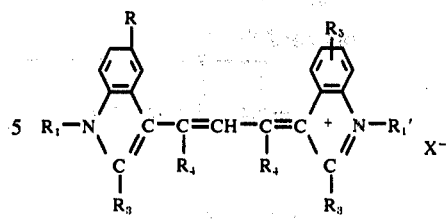

[I]

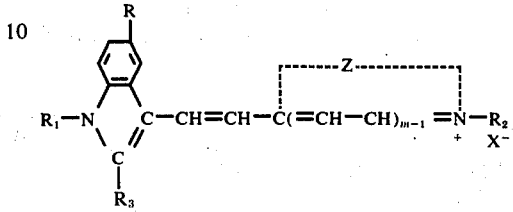

[II]

TABLE II

| Example | Concentration | Potentials (°) anodic | cathodic | Relative sensitivity | $D_{max}$ | λ max. of sensitization |
|---|---|---|---|---|---|---|
| yellow pina | 500 | — | — | TEST | 1.50 | — |
| 8 | " | + 0.84 | − 0.31 | + 0.8 | 2.20 | 540 nm. |
| 9 | " | + 0.84 | − 0.28 | + 0.9 | 1.75 | 565 nm. |
| 10 | " | + 0.89 | − 0.17 | + 0.8 | 1.60 | 560 nm. |
| 11 | 400 | + 0.82 | − 0.31 | + 0.9 | 2.00 | 540 nm |
| 12 | " | + 0.92 | − 0.35 | + 0.5 | 2.58 | 545 nm. |
| 13 | " | + 0.81 | − 0.30 | + 0.7 | 2.00 | 535 nm. |
| 14 | — | + 0.86 | − 0.32 | — | — | — |
| 15 | 400 | + 1.11 | − 0.49 | + 0.1 | 2.00 | 525 nm |
| 24 | 500 | + 0.88 | − 0.55 | + 0.9 | 1.70 | 590 nm. |
| 25 | " | + 0.92 | − 0.58 | + 0.9 | 1.70 | 590 nm. |
| 26 | " | + 0.82 | − 0.35 | + 0.9 | 1.80 | 625 nm. |
| 27 | " | + 0.90 | − 0.21 | + 0.7 | 1.70 | 585 nm. |
| 28 | 500 | + 1.02 | − 0.39 | + 0.3 | 1.95 | 615 nm. |
| 29 | " | + 0.96 | − 0.43 | + 0.0 | 2.00 | 620 nm. |
| 31 | " | + 0.96 | − 0.12 | + 0.5 | 1.95 | 510 nm. |
| 32 | " | + 0.94 | − 0.46 | − 0.1 | 2.00 | 525 nm. |
| 33 | " | + 0.98 | − 0.61 | + 0.7 | 1.95 | 550 nm. |
| 34 | 400 | + 0.94 | − 0.12 | + 1.2 | 2.20 | 580 nm. |
| 35 | " | + 0.87 | − 0.25 | + 0.6 | 2.46 | 550 nm. |
| 36 | " | + 1.00 | − 0.28 | + 0.7 | 2.20 | 550 nm. |
| 37 | " | + 0.90 | − 0.54 | + 1.0 | 2.50 | 605 nm. |

(°) The polarographic anodic and cathodic potential values, reported in table II, are referred to the absolute potential scale.
As described by Tani and Kikuchi in Phot. Sci. Engng. 11 (3) 129 (1967) for symmetrical cyanine dyes and by Shiba and Kubodera in "Preprint (NB 12)" of I.C.P.S. - 1970, Moscow, for merocyanine dyes, the polarographic potential values are strictly referred to their electronic energy levels and therefore to their photographic behavior.
The measurements can be carried out following the methods reported in P. Delahay, "New instrumental methods in Electrochemistry", Interscience Publ. Inc., New York, 1954 and those reported in I. M. Koltoff and J. J. Lingane, "Polarography", 2nd edition, Interscience Publ. Inc., New York and in R. N. Adams, "Electrochemistry at solid electrode", Marcel Dekker Inc., New York, 1969.
The cathodic half-wave polarographic potential value (E red) is the value in volts corresponding to the more positive cathodic wave. This value is obtained by using a dropping mercury electrode (DME) in a solution of $1.10^{-4} + 10^{-5}$ M of the electron acceptor in a suitable solvent, as methyl alcohol containing lithium chloride (0.05 M) at 20° C.
The anodic half-peak voltammetric potential value (E ox) is the value in volts corresponding to the more negative anodic wave.
This value is determined by using a carbon paste electrode in an aqueous solvent solution of $1.10^{-4} + 1.10^{-6}$ M of the electron acceptor, for example a 50% methanolic solution, containing sodium acetate (0.05 M) and acetic acid (0.005 M). The reference electrode is a Ag.AgCl - KCl (s) in water at 20° C.
The electron acceptors useful according to this invention have an anodic (E ox) and a cathodic (E red) polarographic half-wave potential, the sum of which is a positive number.

The dyes of the present invention can be used as filter dyes useful in photography. For instance, solutions of dyes of Examples Nos. 6, 24, 32, 38 and 39 are bleached by R6 developer solutions having the above reported composition.

FIG. 1 shows the Jarrell-Ash spectra of some electron acceptor spectral sensitizers tested in the above described experimental conditions whose data are reported in table II.

What we claim is:

1. A light-sensitive, fogged direct positive silver halide emulsion characterized in that it contains a sensitizing amount of cyanine dye corresponding to one of the following formulae:

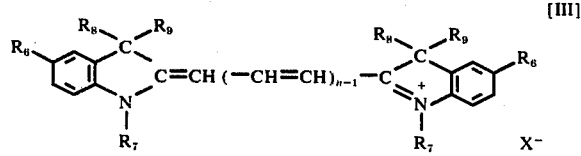

[III]

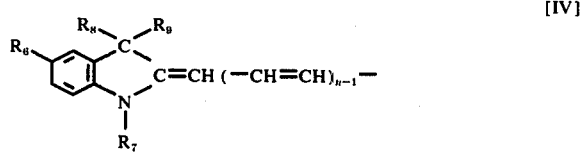

[IV]

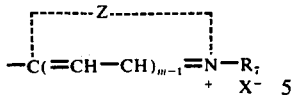

wherein:
- *m* represents a positive integer of from 1 to 2;
- *n* represents a positive integer of from 2 to 4;
- R, $R_6$ each represent a benzoyl group or a phenylsulfonyl group;
- $R_1$, $R_1{'}$, $R_2$ and $R_7$ each represent a substituted or non-substituted acyclic hydrocarbon substituent; an alkylaryl substituent or an aryl substituent;
- $R_3$ represents an aryl or substituted aryl group;
- $R_4$ represents an hydrogen atom, an alkyl group having from 1 to 4 carbon atoms, an aryl group, a thienyl group, with the proviso that at least one of the two substituents $R_4$ is an hydrogen atom;
- $R_5$ represents an hydrogen atom, an alkyl group, an alkoxy group, an aryloxy group, an halogen atom, a nitro group, a benzoyl group or a phenylsulfonyl group;
- $R_8$, $R_9$ each represent an alkyl group containing from 1 to 4 carbon atoms;
- $X^-$ represents an acid anion; and
- Z represents the non-metallic atoms necessary to complete a heterocyclic nucleus containing from 5 to 6 atoms in the heterocyclic ring, said non-metallic atoms being selected from the group consisting of carbon, oxygen, sulfur, nitrogen, and selenium atoms.

2. Light-sensitive fogged direct positive silver halide emulsions according to claim 1 characterized in that they contain a sensitizing amount of 1-methyl-3'-ethyl-5-phenyl-sulfonyl-6'-nitro-4-phenyl-3-indole-thiacarbocyanine iodide.

3. Light-sensitive, fogged direct positive silver halide emulsions according to claim 1 characterized in that they contain a sensitizing amount of 1,1'-diethyl-3,3',3'-tetramethyl-5,5'-diphenylsulfonyl-indocarbocyanine iodide.

4. Light-sensitive, fogged direct positive silver halide emulsions according to claim 1 characterized in that they contain a sensitizing amount of 1,3'-diethyl-5-phenylsulfonyl-6'-nitro-3,3-dimethyl-indo-thiocarbocyanine iodide.

5. Light-sensitive, fogged direct positive silver halide emulsions, according to claim 1 characterized in that they contain a sensitizing amount of 1-methyl-1'-ethyl-2-phenyl-5-nitro-5'-phenylsulfonyl-3', 3'-dimethyl-indocarbocyanine iodide.

6. Direct positive photographic elements, characterized in that they contain at least one layer of light-sensitive emulsion as claimed in claim 1.

* * * * *

UNITED STATES PATENT AND TRADEMARK OFFICE
CERTIFICATE OF CORRECTION

PATENT NO. : 4,025,347
DATED : May 24, 1977
INVENTOR(S) : Paolo Beretta and Luigi Valbusa It is certified that error appears in the above-identified patent and that said Letters Patent are hereby corrected as shown below:

In the Title, "Togged" should be --Fogged--.

Column 2, line 2, "-butyryloxypropyl" should be --ω-butyryloxypropyl--.

Column 2, line 11, "; represents" should be --$R_2$ represents--.

Column 2, line 66, "β-methoxy" should be --8-methoxy--.

Column 3, line 3, "osazole" should be --oxazole--.

Column 3, line 36, "1-ixoquinoine" should be --1-isoquinoline--.

Column 4, line 48, "indolocarboxyanine" should be --indolocarbocyanine--.

Column 4, line 52, "indolocarboxyanine" should be --indolocarbocyanine--.

Column 4, line 56, "indolocarboxyanine" should be --indolocarbocyanine--.

Column 4, line 68, "indolocarboxyanine" should be --indolocarbocyanine--.

Column 5, line 2, "indolocarboxyanine" should be --indolocarbocyanine--.

UNITED STATES PATENT AND TRADEMARK OFFICE
CERTIFICATE OF CORRECTION

PATENT NO. : 4,025,347
DATED : May 24, 1977
INVENTOR(S) : Paolo Beretta and Luigi Valbusa It is certified that error appears in the above-identified patent and that said Letters Patent are hereby corrected as shown below:

Column 7, line 12, "single said" should be --single and--.

Column 8, line 6, "δ-carboxyropyl" should be --δ-carboxypropyl--.

Column 10, line 64, "was found in a mortar" should be --was ground in a mortar--.

Column 11, line 19, "was found in a mortar" should be --was ground in a mortar--.

Column 11, line 51, "was found in a mortar" should be --was ground in a mortar--.

Column 11, line 57, "76.20" should be --72.60--.

Column 14, line 63, after "3-indolothiacarbocyanine iodide" insert

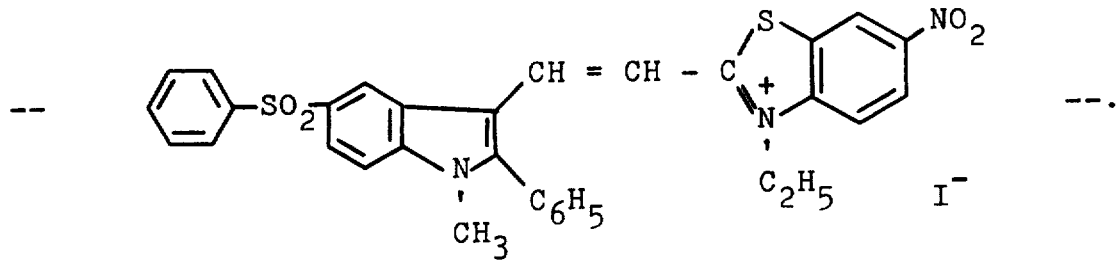

UNITED STATES PATENT AND TRADEMARK OFFICE
CERTIFICATE OF CORRECTION

PATENT NO. : 4,025,347
DATED : May 24, 1977
INVENTOR(S) : Paolo Beretta and Luigi Valbusa It is certified that error appears in the above-identified patent and that said Letters Patent are hereby corrected as shown below:

Column 15, line 5, "... 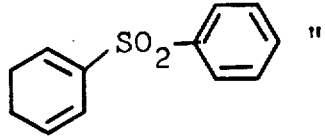 "

should be -- ... 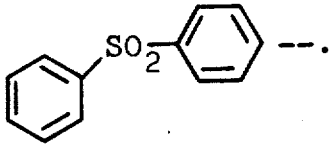 --.

Column 15, line 45, "... 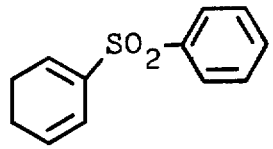 " should be

-- ... 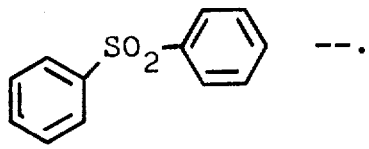 --.

Column 16, line 15, "... 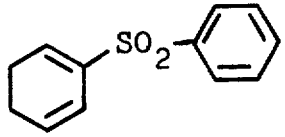 " should be

-- ... 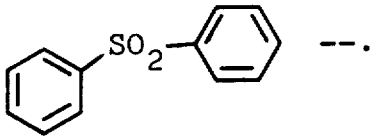 --.

UNITED STATES PATENT AND TRADEMARK OFFICE
CERTIFICATE OF CORRECTION

PATENT NO. : 4,025,347
DATED : May 24, 1977
INVENTOR(S) : Paolo Beretta and Luigi Valbusa It is certified that error appears in the above-identified patent and that said Letters Patent are hereby corrected as shown below:

Column 24, line 27, "0.9 g of 0.9 g of " should be --0.9 g of--.

Column 32, line 59, "per pole of Ag" should be --per mole of Ag--.

Claim 2, line 4, "...-6'-nitro-4-phenyl-" should be --...-6'-nitro-2-phenyl- --.

Signed and Sealed this

Eighth Day of November 197

[SEAL]

Attest:

RUTH C. MASON
Attesting Officer

LUTRELLE F. PARKER
Acting Commissioner of Patents and Trademarl